(12) United States Patent
Yennapureddy et al.

(10) Patent No.: US 12,395,526 B2
(45) Date of Patent: Aug. 19, 2025

(54) DETECTING IDENTITY SPOOFING ATTACKS IN MULTI-SENSOR SYSTEMS AND APPLICATIONS

(71) Applicant: NVIDIA Corporation, Santa Clara, CA (US)

(72) Inventors: Manoj Kumar Yennapureddy, Apex, NC (US); Shagan Sah, Santa Clara, CA (US); Rajath Shetty, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 276 days.

(21) Appl. No.: 17/863,140

(22) Filed: Jul. 12, 2022

(65) Prior Publication Data

US 2024/0022601 A1 Jan. 18, 2024

(51) Int. Cl.
*H04L 9/40* (2022.01)
*G06T 7/50* (2017.01)

(52) U.S. Cl.
CPC ............ *H04L 63/1466* (2013.01); *G06T 7/50* (2017.01); *H04L 63/1416* (2013.01); *G06T 2207/10028* (2013.01); *G06T 2207/20076* (2013.01); *G06T 2207/20084* (2013.01)

(58) Field of Classification Search
CPC .................................................. H04L 63/0861
See application file for complete search history.

(56) References Cited

U.S. PATENT DOCUMENTS

| 11,146,747 | B1* | 10/2021 | Zhang | H04N 13/254 |
| 2016/0269411 | A1* | 9/2016 | Malachi | H04L 63/0421 |
| 2018/0307815 | A1* | 10/2018 | Samadani | G06V 40/45 |
| 2020/0026830 | A1* | 1/2020 | Alameh | H04L 63/105 |
| 2021/0082136 | A1* | 3/2021 | Nikitidis | G06V 40/172 |
| 2021/0168347 | A1* | 6/2021 | Margolin | H04N 13/25 |
| 2021/0240808 | A1* | 8/2021 | Deore | G06V 40/45 |
| 2021/0312734 | A1* | 10/2021 | Bajaj | H04L 9/14 |
| 2021/0358149 | A1* | 11/2021 | Tian | G02B 26/0833 |
| 2022/0327189 | A1* | 10/2022 | Belli | G06F 21/32 |
| 2022/0358798 | A1* | 11/2022 | Chan | G07C 5/0841 |
| 2024/0282149 | A1* | 8/2024 | Yang | G06V 10/82 |

OTHER PUBLICATIONS

"Deep Texture Features for Robust Face Spoofing Detection" by de Souza et al., IEEE Transactions on Circuits and Systems, vol. 64, No. 12, 2017, pp. 1397-1401. (Year: 2017).*
Deep Texture (Year: 2017).*

* cited by examiner

*Primary Examiner* — William S Powers
(74) *Attorney, Agent, or Firm* — Taylor Duma L.L.P.

(57) ABSTRACT

In various examples, techniques are described for detecting whether spoofing attacks are occurring using multiple sensors. Systems and methods are disclosed that include at least a first sensor having a first pose to capture a first perspective view of a user and a second sensor having a second pose to capture a second perspective view of the user. The first sensor and/or the second sensor may include an image sensor, a depth sensor, and/or the like. The systems and methods include a neural network that is configured to analyze first sensor data generated by the first sensor and second sensor data generated by the second sensor to determine whether a spoofing attack is occurring. The systems and methods may also perform one or more processes, such as facial recognition, based on whether the spoofing attack is occurring.

20 Claims, 17 Drawing Sheets

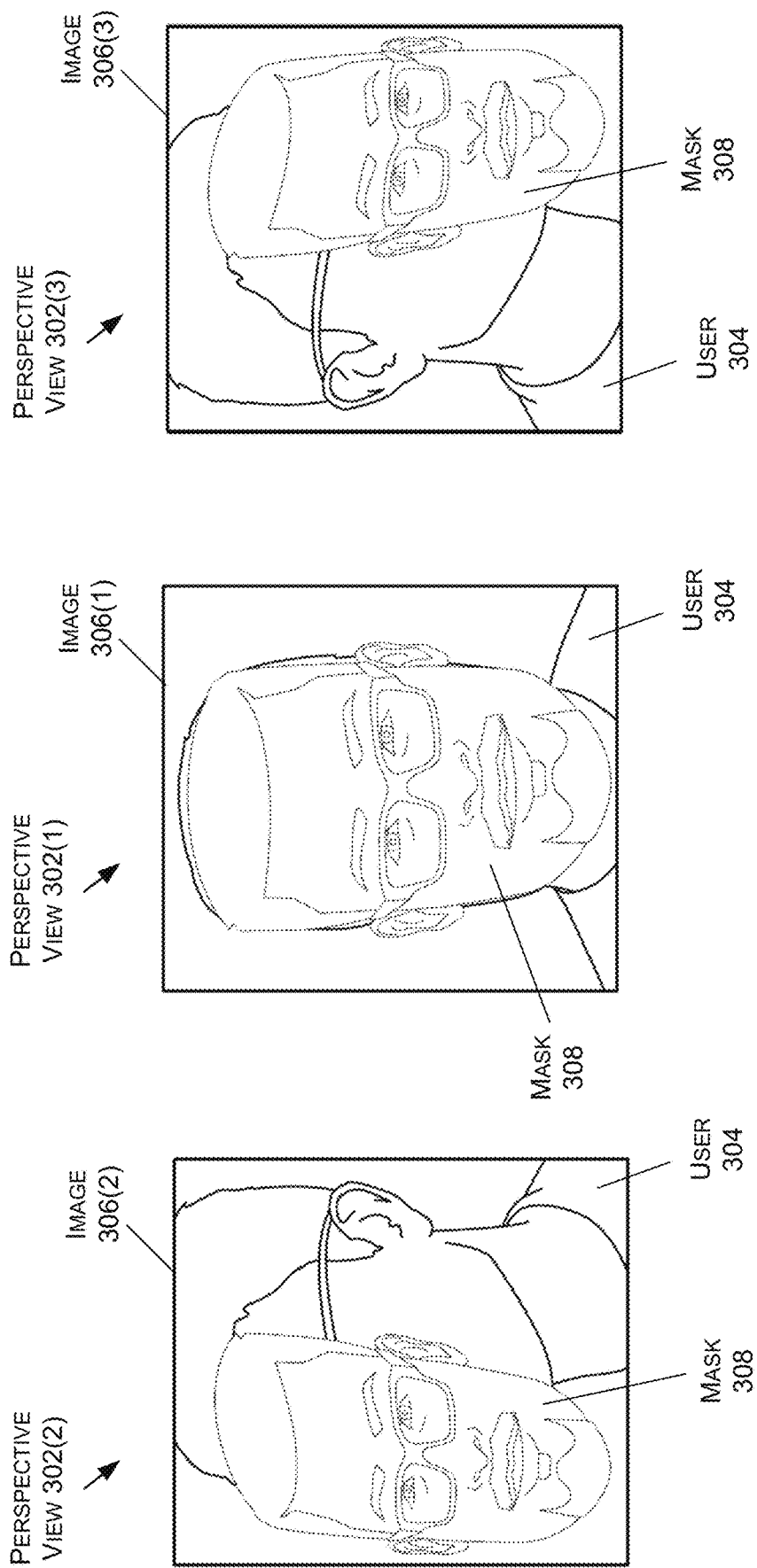

DETECTING IDENTITY SPOOFING ATTACKS IN MULTI-SENSOR SYSTEMS AND APPLICATIONS

BACKGROUND

Facial recognition has become important for many technologies. For instance, facial recognition is implemented in numerous applications, such as security, health, education, marketing, finance, entertainment, human-computer interaction, and the like. To perform facial recognition, a facial recognition system processes data received from a camera by comparing the received data to data stored in one or more databases, where the stored data is associated with identities of known and/or verified users. Based on the comparison, the facial recognition system may identify a match between the received data and stored data. The facial recognition system may then use the identity associated with the stored data to identify and/or authenticate the user represented by the received data. While facial recognition systems are able to identify and authenticate users using such processes, the facial recognition systems are also vulnerable to spoofing attacks.

A spoofing attack occurs when a nefarious user tries to trick a facial recognition system into wrongfully identifying the nefarious user as a verified user. The nefarious user may take one or more actions in order to perform the spoofing attack on the facial recognition system, such as presenting a device that is displaying an image and/or video of the verified user, presenting a physical image depicting the verified user (e.g., the face of the verified user, the top half of the verified user, an entirety of the verified user, etc.), wearing a mask (e.g., a two-dimensional mask, a three-dimensional mask, etc.) representing the verified user, and/or otherwise attempting to impersonate a verified user. Because of this, preventing spoofing attacks has become important for facial recognition systems. For instance, a facial recognition system that provides control access to a verified user of a vehicle or other machine type (e.g., to turn the vehicle or machine on, to control the vehicle or machine, etc.) may initially determine if a spoofing attack is occurring to prevent providing the control access to the nefarious user.

Many traditional techniques have been created to attempt to detect spoofing attacks for facial recognition systems. These traditional techniques may include analyzing image data generated by a camera to detect a liveliness of the user represented by the image data (e.g., determine if the user is moving, such as blinking his or her eyes). As such, many of these techniques, such as techniques that use a recurrent neural network (RNN) or a long short-term memory (LSTM) network, require processing the sensor data over a period of time. However, these traditional techniques may be deficient for various reasons. For example, since these traditional techniques generally only process data generated by a single sensor, or by two or more sensors that are substantially co-located, these traditional techniques may not detect specific types of spoofing attacks, such as when the nefarious actor places an image of the verified user between the face of the nefarious actor and the sensor (e.g., with cut outs around the eyes to trick eye blinking based methods). Additionally, since these traditional techniques require processing data over a period of time, these traditional techniques may require more compute resources and/or time to determine whether a spoofing attack is occurring—thus increasing latency in the system and reducing the ability for real-time or near real-time deployment of such systems.

SUMMARY

Embodiments of the present disclosure relate to techniques for detecting spoofing attacks using multiple sensors with varying poses. Systems and methods are disclosed that receive sensor data from sensors having varying poses, such that the sensors may be located at different positions and/or oriented in different directions with respect to one another. This way, the sensors are able to generate sensor data representing different perspective views of a user. The systems and methods also process the sensor data using a neural network that is configured to output data indicating whether a spoofing attack is occurring. For example, the output may include a confidence or probability that a spoofing attack is occurring and/or a confidence or probability that a spoofing attack is not occurring, and/or the output may include a Boolean output (e.g., "0" or "1") indicating whether a spoofing attack is occurring or not. The systems and methods may then perform one or more processes based on whether the output indicates a spoofing attack is occurring or not, such as to (i) process the sensor data using one or more facial recognition techniques to identify the user when the spoofing attack is not occurring or (ii) generate data (e.g., a message, an external indication, an internal indication, etc.) indicating that the spoofing attack is occurring.

In contrast to conventional systems, such as those described above, the accuracy at which the described system can detect spoofing attacks may be increased. For example, and as discussed above, traditional systems generally use a single sensor or two or more sensors that are substantially co-located, thus only capturing the user from a same perspective view. Because of this, these traditional systems may be unable to detect various spoofing attacks, such as spoofing attacks that are more challenging to identify (e.g., when a user wears a three-dimensional (3D) mask) and even spoofing attacks that are less challenging to identify (e.g., when a user holds a two-dimensional (2D) image in front of his or her face). In contrast, the described system is able to determine that even the most challenging spoofing attacks are occurring since the described system uses sensors that capture different perspective views of the nefarious actor. In addition, in one or more embodiments, the sensors may capture varying sensor data types—e.g., image data and depth data—which may further increase the robustness of the described system with respect to detecting spoofing attacks. As such, even when the nefarious actor is covering his or her face with a mask, picture, or tablet, which may be difficult to detect with a sensor positioned in front of the nefarious actor, one or more of the other sensors are able to capture a different perspective view and/or to capture a different type of data (e.g., including depth information) of the nefarious actor, where these other perspective views may indicate that the mask, picture, or tablet is being placed over the face of the nefarious actor. Because of this, the described system may determine that the spoofing attack is occurring.

Additionally, by performing the processes described herein, the described system may conserve computing resources and/or more quickly determine (e.g., in real time or near real time) whether a spoofing attack is occurring as compared to traditional systems. For example, and as discussed herein, the traditional systems may require generating image data over a period of time that is then used to determine whether a spoofing attack is occurring. This may both require increased compute resources and/or time to perform. In contrast, the described system is able to use sensor data generated at an instance in time to determine whether a spoofing attack is occurring by relying on the sensor data generated from various sensors having different perspective views of the user.

BRIEF DESCRIPTION OF THE DRAWINGS

The present systems and methods for detecting spoofing attacks using multiple sensors with varying poses are described in detail below with reference to the attached drawing figures, wherein:

FIG. 3 illustrates an example of sensors capturing various perspective views of a user, in accordance with some embodiments of the present disclosure;

DETAILED DESCRIPTION

Figure 1:
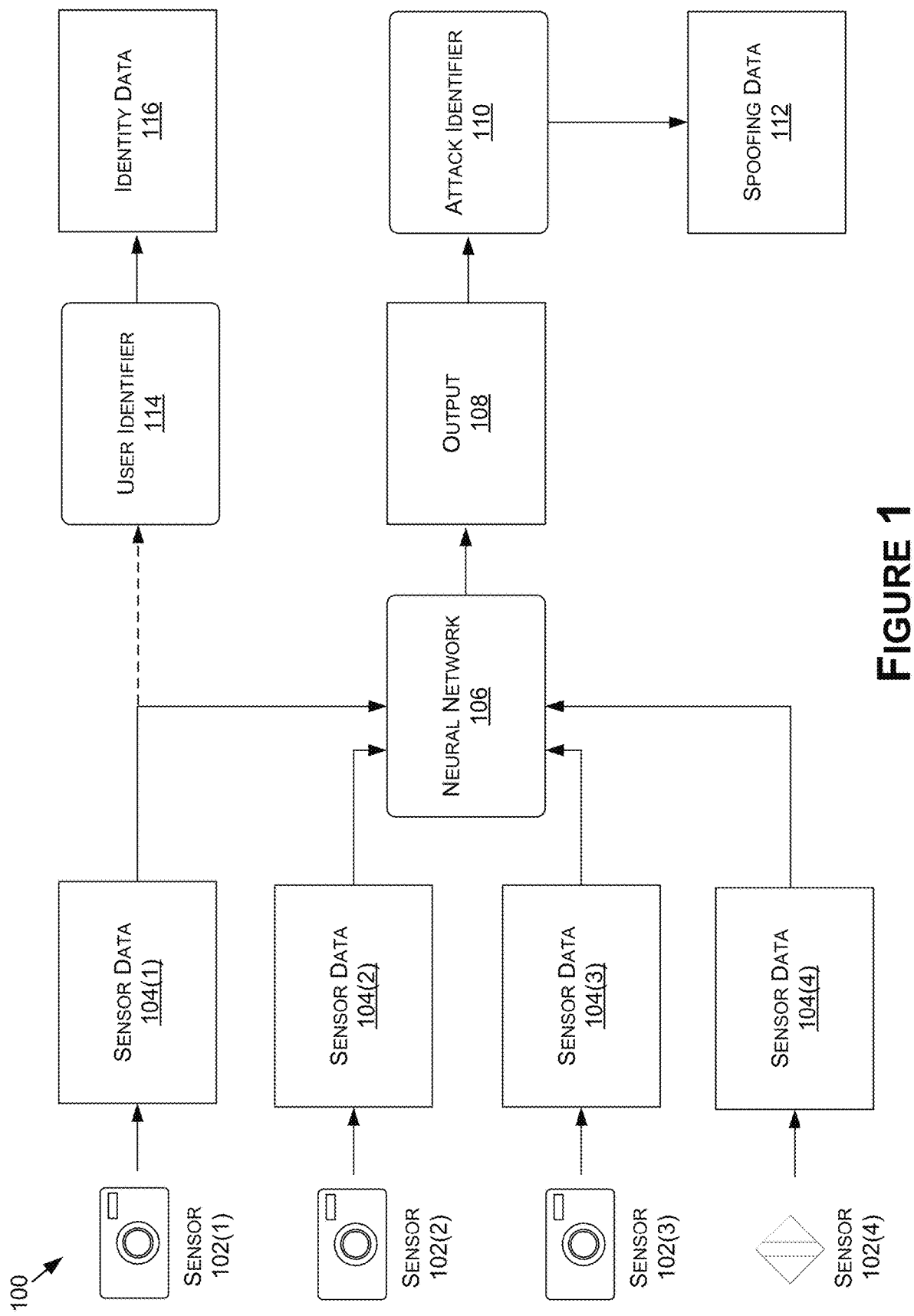
FIG. 1 illustrates an example data flow diagram for a process of detecting spoofing attacks using sensors that include varying poses, in accordance with some embodiments of the present disclosure.

Systems and methods are disclosed related to techniques for detecting spoofing attacks using multiple sensors with varying poses. Although the present disclosure may be described with respect to an example autonomous vehicle 1000 (alternatively referred to herein as "vehicle 1000" or "ego-machine 1000," an example of which is described with respect to FIGS. 10A-10D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to security techniques, this is not intended to be limiting, and the systems and methods described herein may be used in augmented reality, virtual reality, mixed reality, robotics, security and surveillance, autonomous or semi-autonomous machine applications, and/or any other technology spaces where security techniques—and specifically facial recognition—may be used.

As described herein, a sensor may include, but is not limited to, an image sensor (e.g., a red-green-blue (RGB) image sensor, an infrared (IR) image sensor, etc.), a depth sensor (e.g., a RADAR sensor, a LIDAR sensor, an ultrasonic sensor, a stereo camera, etc.), and/or any other type of sensor. The sensors of a system may have varying poses, such that the sensors may be located at different positions and/or in different orientations with respect to one another. As a result, the sensors may be configured to capture different perspective views of users. For example, a first sensor may generate first sensor data that represents a first perspective view (e.g., a front view) of a user, a second sensor may generate second sensor data that represents a second perspective view (e.g., a right-side view) of the user, a third sensor may generate third sensor data that represents a third perspective view (e.g., a left-side view) of the user, and/or so forth. This way, the sensors of the system capture multiple perspective views of the user, which the system is then able to use when detecting spoofing attacks.

For instance, the system may process the sensor data using a neural network that is configured to detect spoofing attacks. To process the sensor data, the neural network may generate feature maps representing features associated with the sensor data generated by each sensor. For instance, and using the example above, the feature maps may include a first feature map representing features determined using the first sensor data of the first sensor, a second feature map representing features determined using the second sensor data of the second sensor, and a third feature map representing features determined using the third sensor data of the third sensor. The neural network may then fuse, combine, and/or concatenate the feature maps to generate an output. For instance, and again using the example above, the neural network may fuse, combine, and/or concatenate the first feature map, the second feature map, and the third feature map to generate the output. The neural network may then process this output to generate a final output indicating whether a spoofing attack is occurring.

The system may then perform one or more processes based on the final output from the neural network. For a first example, if the system determines that a spoofing attack is not occurring based on the final output, then the system may process at least a portion of the sensor data (e.g., using one or more facial recognition techniques) to identify and/or authenticate the user. For a second example, if the system determines that a spoofing attack is occurring based on the final output, the system may generate data indicating that the spoofing attack is occurring, refrain from providing the user with access to a device (and/or software), output an alert or generate a message that indicates that the spoofing attack is occurring, and/or the like.

The systems and methods described herein may be used for a variety of purposes, by way of example and without limitation, for authenticating users for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of detecting spoofing attacks using sensors with varying poses, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include sensors 102(1)-(4) (also referred to singularly as "sensor 102" or in plural as "sensors 102") generating sensor data 104(1)-(4) (also referred to as "sensor data 104"). As described herein, each of the sensors 102 may include, but are not limited to, an image sensor (e.g., a RGB image sensor, an IR image sensor, etc.), a depth sensor (e.g., a RADAR sensor, a LIDAR sensor, etc.), and/or any other type of sensor. For instance, and in the example of FIG. 1, the first sensor 102(1) may include a first image sensor that generates first image data (e.g., the first sensor data 104(1)), the second sensor 102(2) may include a second image sensor that generates second image data (e.g., the second sensor data 104(2)), the third sensor 102(3) may include a third image sensor that generates third image data (e.g., the third sensor data 104(3)), and the fourth sensor 102(4) may include a RADAR sensor that generates RADAR data (e.g., the fourth sensor data 104(4)). While the example of FIG. 1 illustrates four sensors 102, in other examples, the process 100 may use any number of sensors 102 (e.g., two sensors 102, three sensors 102, five sensors 102, etc.). Additionally, while the example of FIG. 1 illustrates the sensors 102(1)-(3) as including image sensors and the fourth sensor 102(4) as including a depth sensor, in other examples, each of the sensors 102 may include any type of sensor.

In embodiments where the sensor data 104 includes image data, the image data may include data representative of images depicting one or more fields of view of one or more cameras (e.g., image sensors) of a vehicle 1000, such as stereo camera(s), wide-view camera(s) (e.g., fisheye cameras), infrared camera(s), surround camera(s) (e.g., 360 degree cameras), long-range and/or mid-range camera(s), and/or other camera type of the autonomous vehicle. In some examples, the image data may be captured in one format (e.g., RCCB, RCCC, RBGC, etc.), and then converted (e.g., during pre-processing of the image data) to another format. In some other examples, the image data may be provided as input to a sensor data pre-processor (not shown) to generate pre-processed image data (discussed herein). Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. In some examples, different formats and/or resolutions could be used for training the neural network(s) than for inferencing (e.g., during deployment of the machine learning model(s) in the autonomous vehicle).

In some examples, the sensors 102 have varying poses such that the sensors 102 are able to capture different perspective views of users. To provide the varying poses, the sensors 102 may be located at different positions and/or oriented in different directions with respect to one another, such as within the vehicle 1000. In some examples, two or more of the sensors 102 may be located at least a threshold distance from one another. The threshold distance may include, but is not limited to, 0.1 meters, 0.5 meters, 1 meter, and/or any other distance. Additionally, or alternatively, in some examples, two or more of the sensors 102 may be oriented in directions that are at least a threshold angle (e.g., in the x-direction, the y-direction and/or the z-direction) different from one another. The threshold angle may include, but is not limited to, 25 degrees, 50 degrees, 90 degrees, and/or any other angle. By using a minimum distance and/or a minimum angle with respect to two or more of the sensors 102, the poses of the two or more sensors 102 may provide different perspective views of users for spoof detection.

Figure 2A:
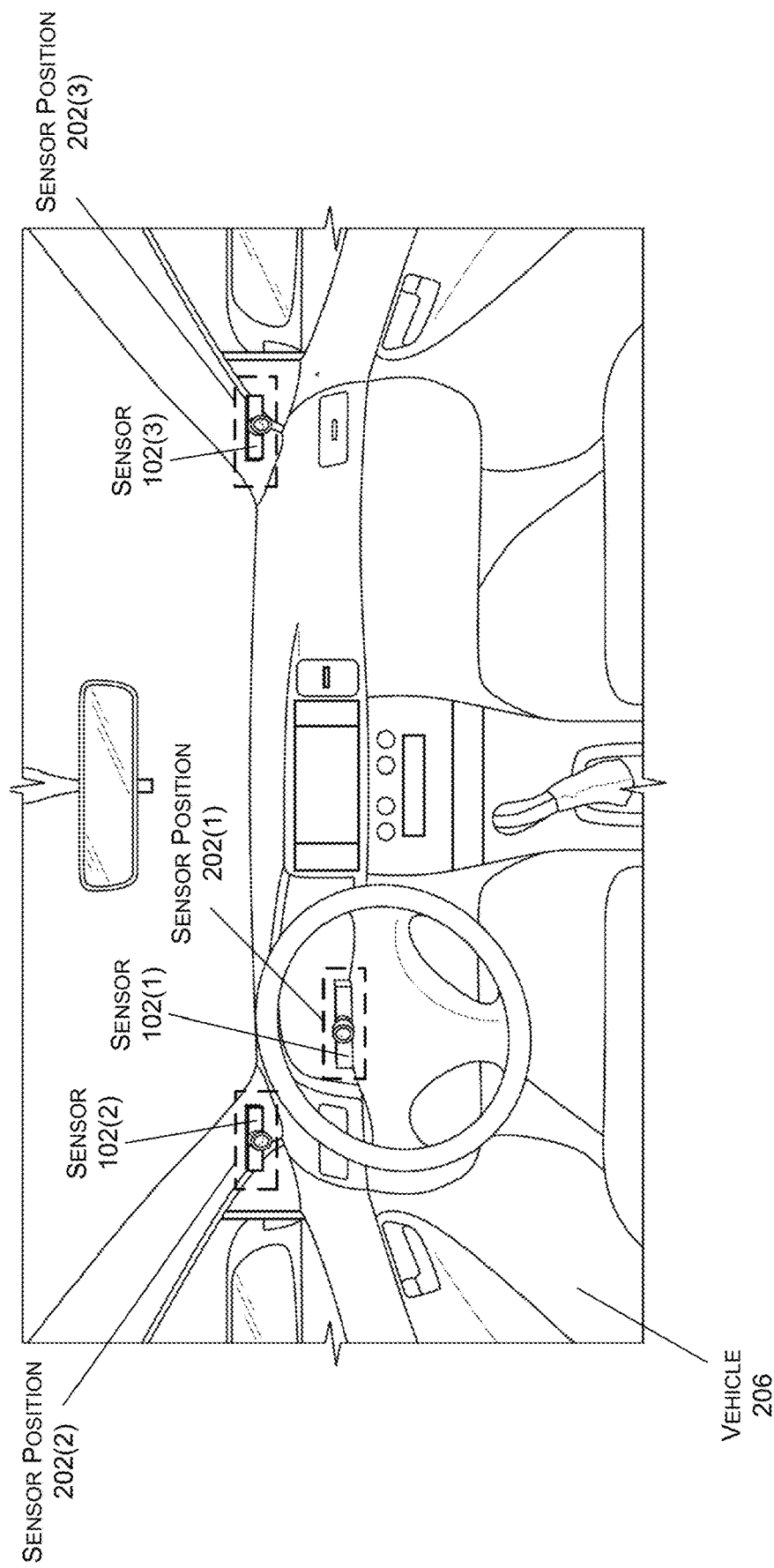
FIGS. 2A-2B illustrate an example of sensors having varying poses based on positions and orientations of the sensors, in accordance with some embodiments of the present disclosure.
Figure 2B:
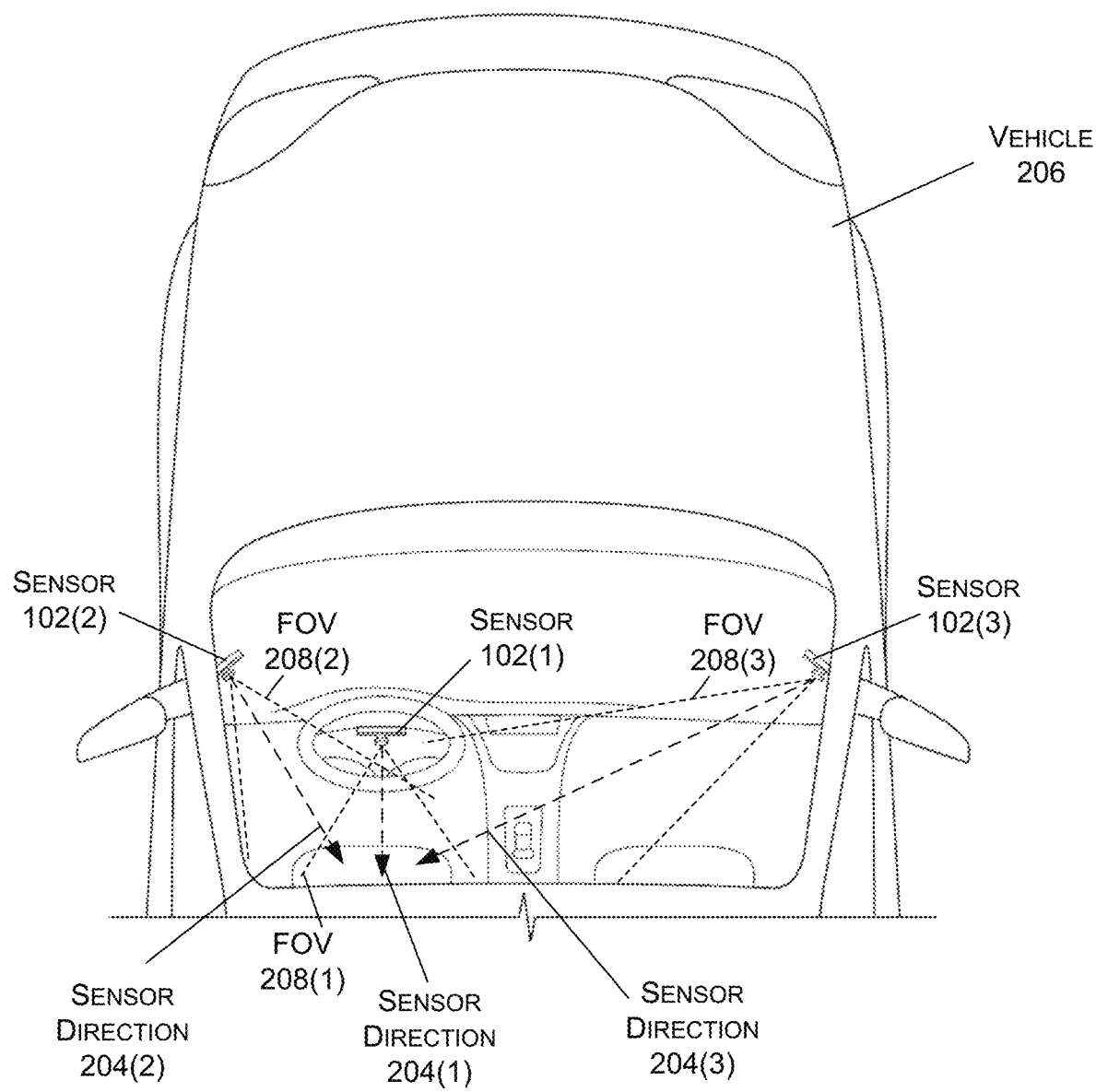

For instance, FIGS. 2A-2B illustrate an example of the sensors 102(1)-(3) having varying poses based on positions 202(1)-(3) and orientations 204(1)-(3) of the sensors 102(1)-(3) within a vehicle 206 (which may represent, and/or include, the vehicle 1000), in accordance with some embodiments of the present disclosure. While the example of FIGS. 2A-2B illustrates the sensors 102(1)-(3) being located within the vehicle 206, in other examples, the sensors 102(1)-(3) may be located in a different type of environment. For example, the sensors 102(1)-(3) may be located in a house, in a building, in an airport, on a machine, and/or the like. Additionally, while the example of FIGS. 2A-2B only illustrates the sensors 102(1)-(3), in other examples, the vehicle 206 may further include the fourth sensor 102(4) and/or an additional sensor(s). For instance, one of the sensors 102(1)-(3) may be replaced with the fourth sensor 102(4).

As shown, the first sensor 102(1) may be located at the first position 202(1) (e.g., on the steering wheel) and oriented in the first orientation 204(2), which causes the first sensor 102(1) to have a first field-of-view (FOV) 208(1). The second sensor 102(2) may be located at the second position 202(2) (e.g., proximate to the driver's door) and oriented in the second orientation 204(2), which causes the second sensor 102(2) to have a second FOV 208(2). Additionally, the third sensor 102(3) may be located at the third position 202(3) (e.g., proximate to the passenger's door) and oriented in the third orientation 204(3), which causes the third sensor 102(3) to have a third FOV 208(3). In some examples, at least a portion of the first FOV 208(1) may overlap with at least a portion of the second FOV 208(2) and/or at least a portion of the third FOV 208(3). Additionally, in some examples, at least a portion of the second FOV 208(2) may overlap with at least a portion of the third FOV 208(3). Because of the overlapping FOVs 208(1)-(3) of the sensors 102(1)-(3), the sensors 102(1)-(3) may be configured to capture various perspective views of users.

For instance, FIG. 3 illustrates an example of the sensors 102(1)-(3) capturing various perspective views 302(1)-(3) (also referred to singularly as "perspective view 302" or in plural as "perspective views 302") of a user 304, in accordance with some embodiments of the present disclosure. In the example of FIG. 3, images 306(1)-(3) (also referred to singularly as "image 306" or in plural as "images 306") captured by the sensors 102(1)-(3) depict the perspective views 302 of the user 304. As shown, the first image 306(1) (which may be represented by the first sensor data 104(1)) generated by the first sensor 102(1) depicts the first perspective view 302(1) of the user 304, where the first perspective view 302(1) is of a front of the user 304. The second image 306(2) (which may be represented by the second sensor data 104(2)) generated by the second sensor 102(2) depicts the second perspective view 302(2) of the user 304, where the second perspective view 302(2) is of a left side of the user 304. Additionally, the third image 306(3) (which may be represented by the third sensor data 104(3)) generated by the third sensor 102(3) depicts the third perspective view 302(3) of the user 304, where the third perspective view 302(3) is of the right side of the user 304.

As discussed herein, it may be difficult for traditional techniques to identify a spoofing attack using image data representing only a single perspective view of the user 304. For instance, traditional techniques may only use the first sensor data 104(1) representing the first image 306(1) to determine whether a spoofing attack is occurring. However, and as shown, it may be difficult for traditional techniques to detect the spoofing attack since the first image 306(1) is depicting a mask 308 over the face of the user 304. As such, the techniques described herein provide improvements by also using the second senor data 104(2) representing the second image 306(2) and/or the third sensor data 104(3) representing the third image 306(3) to determine whether a spoofing attack is occurring. As shown, each of the second image 306(2) and the third image 306(3) depict the mask 308, but also depict a large portion of the face of the user 304.

Referring back to FIG. 1, in some examples, the process 100 may include processing at least a portion of the sensor data 104. For example, such as when the sensor data 104 (e.g., the sensor data 104(1)-(3)) includes image data, the image data may represent the user 304 along with at least a portion of a background of the environment (e.g., the vehicle 206) for which the user 304 is located. As such, the image data may be processed using one or more cropping techniques to remove at least a portion of the image data that represents the background.

For example, a facial detection or object detection algorithm (e.g., using a machine learning model, neural network, computer vision algorithm, etc.) may be implemented to identify a bounding shape corresponding to a face or head of the user 304, and an image represented by the image data may be cropped to include only a portion of the image data corresponding to the bounding shape. This way, a greater portion of the processed image data represents the user 304 rather than the background around the user 304, which may improve the processing of the image data as described herein. While this example describes processing image data using one or more cropping techniques, in other examples, similar processes may be performed to other types of sensor data. Additionally, in other examples, the sensor data 104 may be processed using one or more additional and/or alternative techniques, such as image restoration, linear filtering, pixilation, and/or the like.

The process 100 may include applying the sensor data 104 to a neural network 106. In some examples, before applying the sensor data 104, a sensor data pre-processor may use image data representative of one or more images (or other data representations) and load the sensor data 104 into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the neural network 106.

In some embodiments, a pre-processing image pipeline may be employed by the sensor data pre-processor to process a raw image(s) acquired by a sensor(s) 102 (e.g., image sensor(s)) and included in the image data to produce pre-processed image data which may represent an input image(s) to the input layer(s) of the neural network 106. An example of a suitable pre-processing image pipeline may use a raw RCCB Bayer (e.g., 1-channel) type of image from the sensor 102 and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

In some examples, to apply the sensor data 104 to the neural network 106, the sensor data 104 may initially be synchronized such that the sensor data 104 that is input into the neural network 106 corresponds to substantially a same time. As described herein, the sensor data 104 may be generated or selected to correspond to approximately the same time based on the sensor data 104 being generated within a millisecond, a second, and/or another period of time of other sensor data 104. In some examples, the sensor data 104 is synchronized using the frame rates of the sensors 102.

Figure 4:
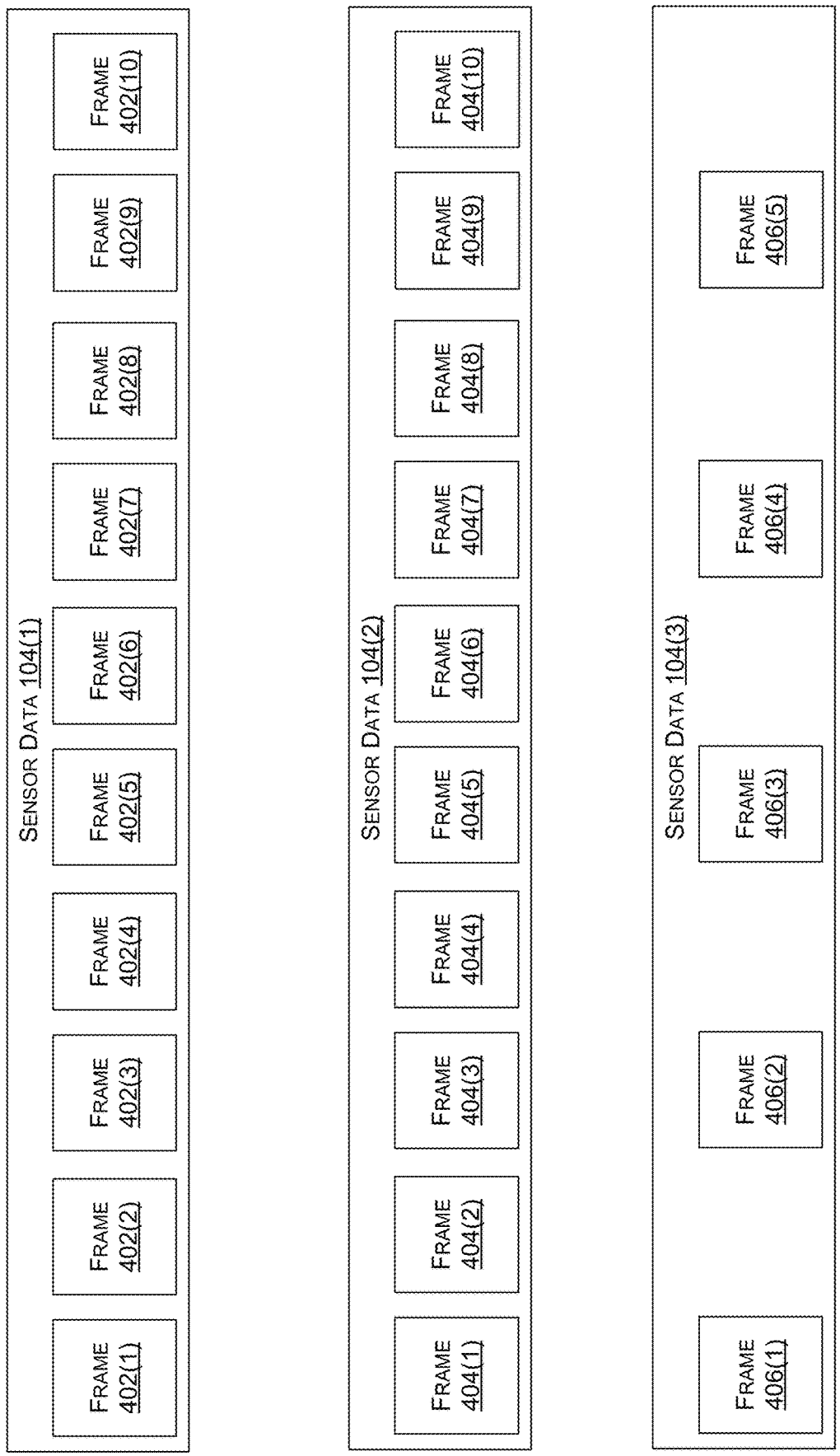
FIG. 4 illustrates an example of synchronizing sensor data using frame rates of sensors, in accordance with some embodiments of the present disclosure.

For instance, FIG. 4 illustrates an example of synchronizing the sensor data 104(1)-(3) using frame rates of the sensors 102(1)-(3), in accordance with some embodiments of the present disclosure. As shown, the first sensor 102(1) may include a first frame rate, the second sensor 102(2) may also include the first frame rate, but the third sensor 102(3) may include a second, different frame rate. In the example of FIG. 4, the sensor data 104(1)-(3) may represent a one-sixth of a second period of time. As such, the first frame rate of the first sensor 102(1) and the second sensor 102(2) may include sixty frames per second (FPS), such that the first sensor data 104(1) represents ten frames 402(1)-(10) (also referred to singularly as "frame 402" or in plural as "frames 402") and the second sensor data 104(2) represents ten frames 404(1)-(10) (also referred to singularly as "frame 404" or in plural as "frames 404"). Additionally, the second frame rate of the third sensor 102(3) may include thirty FPS, such that the third sensor data 104(3) represents five frames 406(1)-(5) (also referred to singularly as "frame 406" or in plural as "frames 406").

As such, in some examples, to synchronize the sensor data 104(1)-(3), every frame 406 represented by the third sensor data 104(3) may be selected, every other frame 402 represented by the first sensor data 104(1) may be selected, and every other frame 404 represented by the second sensor data 104(2) may be selected. This may be because the first frame 402(1), the first frame 404(1), and the first frame 406(1) are generated at approximately the same time, the third frame 402(3), the third frame 404(3), and the second frame 406(2) are generated at approximately the same time, the fifth frame 402(5), the fifth frame 404(5), and the third frame 406(3) are generated at approximately the same time, and/or so forth.

While this example describes selecting every frame 406, in other examples, a lesser amount to the frames 406 may be selected when performing synchronization. For example, every other frame 406 represented by the third sensor data 104(3) may be selected, every fourth frame 402 represented by the first sensor data 104(1) may be selected, and every fourth frame 404 represented by the second sensor data 104(2) may be selected. Additionally, while the example of FIG. 4 describes selecting frames 402-406 of the sensor data 104(1)-(3) (e.g., image data) generated by the sensors 102(1)-(3), in other examples, similar processes may be performed to select frames of other types of sensor data 104, such as the fourth sensor data 104(4). Furthermore, in other examples, additional and/or alternative techniques may be used to synchronize the sensor data 104.

For example, the sensor data 104 may be associated with timestamps. For instance, and using the example illustrated in FIG. 4, the frames 402 represented by the first sensor data 104(1) may be associated with timestamps indicating times the frames 402 were generated, the frames 404 represented by the second sensor data 104(2) may be associated with timestamps indicating times the frames 404 were generated, and the frames 406 represented by the third sensor data 104(3) may be associated with timestamps indicating times the frames 406 were generated. As such, the frames 402, 404, and 406 of the sensor data 104(1)-(3) may be selected using the timestamps. For instance, the fifth frame 402(5), the fifth frame 404(5), and the third frame 406(3) may be associated with timestamps that are approximately equal to one another. As such, the fifth frame 402(5), the fifth frame 404(5), and the third frame 406(3) may be selected.

Referring back to FIG. 1, after processing and/or synchronizing the sensor data 104, the sensor data 104 may be applied to the neural network 106. As described herein, the neural network 106 may be configured to determine whether a spoofing attack is occurring. For instance, to process the sensor data 104, one or more first layers of the neural network 106 initially analyze the sensor data 104 and output feature maps representing low-level features associated with the sensor data 104 generated by each sensor 102. For example, the feature maps output by the first layer(s) may include a first feature map representing first low-level features determined using the first sensor data 104(1), a second feature map representing second low-level features determined using the second sensor data 104(2), a third feature map representing third low-level features determined using the third sensor data 104(3), and a fourth feature map representing fourth low-level features determined using the fourth sensor data 104(4). As describes herein, the low-level features as identified using the first layer(s) of the neural network 106 may correspond to, but are not limited to, edge boundaries, gradients, and/or other types of features.

The neural network 106 may then analyze the feature maps representing the low-level features using one or more second layers and, based on the analysis, output feature maps representing high-level features associated with the sensor data 104 generated by each sensor 102. For instance, and using the example above, the feature maps output by the second layer(s) may include a fifth feature map representing first high-level features determined using the first feature map, a sixth feature map representing second high-level features determined using the second feature map, a seventh feature map representing third high-level features determined using the third feature map, and an eighth feature map representing fourth high-level features determined using the fourth feature map. As such, the neural network 106 may initially process the sensor data 104 to generate, for each sensor 102, a respective feature map representing high-level features associated with the sensor data 104 generated by the sensor 102.

The neural network 106 may then fuse, combine, or concatenate the features maps representing the high-level features to generate an output. For instance, and again using the example above, the neural network 106 may fuse, combine, and/or concatenate the fifth feature map, the sixth feature map, the seventh feature map, and the eighth feature map to generate the output. The neural network 106 may then process this output in order to generate a final output 108 indicating whether a spoofing attack is occurring. In some examples, the output 108 may include an indication that a spoofing attack is occurring or an indication that a spoofing attack is not occurring. For a first example, the output 108 may include a confidence or probability that a spoofing attack is occurring and/or a confidence or probability that a spoofing attack is not occurring. For a second example, the output 108 may include a Boolean output—e.g., "0" or "1"—indicating whether a spoofing attack is occurring or not.

Figure 5A:
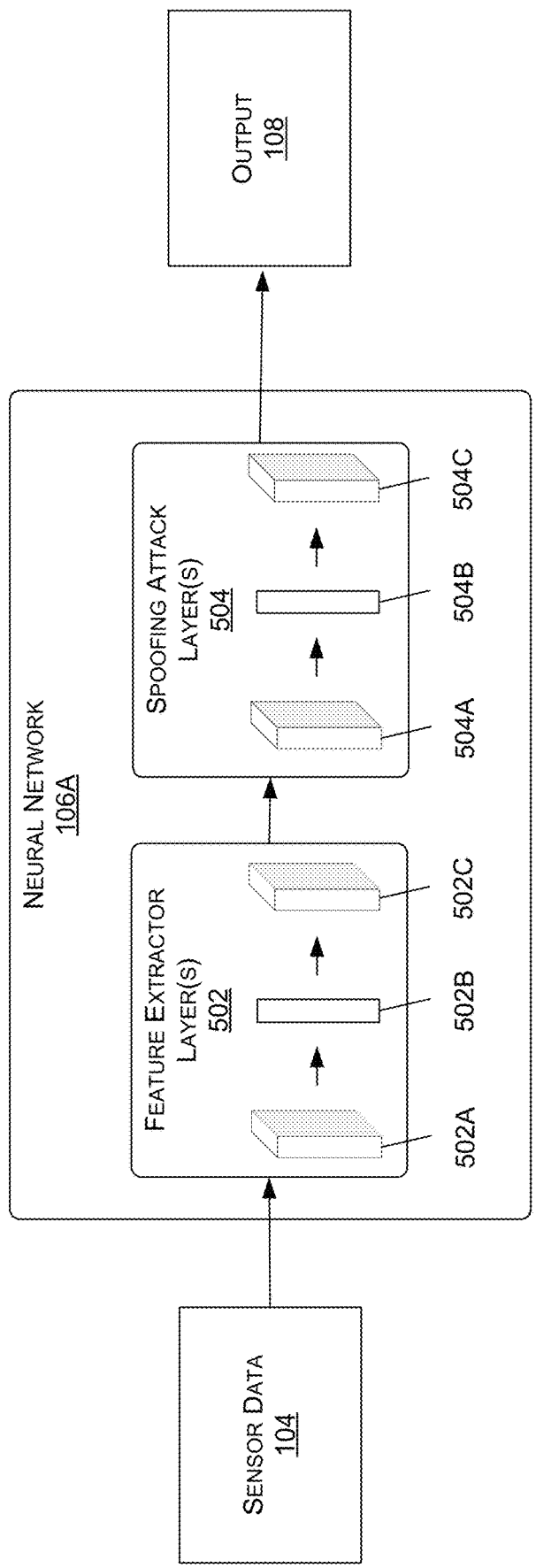
FIGS. 5A-5B illustrate example neural networks for processing sensor data in order to detect a spoofing attack, in accordance with some embodiments of the present disclosure.

For instance, FIG. 5A is an illustration of an example neural network 106A, in accordance with some embodiments of the present disclosure. The neural network 106A may be one example of a machine learning model that may be used to perform one or more of the processes described herein. The neural network 106A may include or be referred to as a convolutional neural network and thus may alternatively be referred to herein as convolutional neural network 106A, convolutional network 106A, or CNN 106A.

As described herein, the neural network 106A may use the sensor data 104 (with or without pre-processing) as an input. The sensor data 104 may represent images generated by one or more cameras (e.g., the sensors 102(1)-(3)), depth data generated by one or more depth sensors (e.g., the fourth sensor 102(4)), and/or any other type of sensor data. More specifically, the sensor data 104 may include individual images generated by the camera(s), where image data representative of one or more of the individual images may be input into the neural network 106A at each iteration of the neural network 106A. The sensor data 104 may be input as a single image, or may be input using batching, such as mini-batching. For example, two or more images may be used as inputs together (e.g., at the same time). The two or more images may be from two or more sensors 102 (e.g., two or more image sensors) that captured the images at the same time.

The sensor data 104 may be input into a feature extractor layer(s) 502 of the neural network 106A. The feature extractor layer(s) 502 may include any number of layers 502, such as the layers 502A-502C. One or more of the layers 502 may include an input layer. The input layer may hold values associated with the sensor data 104. For example, when the sensor data 104 is an image(s), the input layer may hold values representative of the raw pixel values of the image(s) as a volume (e.g., a width, W, a height, H, and color channels, C (e.g., RGB), such as 32.times.32.times.3), and/or a batch size, B (e.g., where batching is used).

One or more layers 502 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 502 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 502 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the neural network 106A may not include any pooling layers. In such examples, other types of convolution layers may be used in place of pooling layers. In some examples, the feature extractor layer(s) 502 may include alternating convolutional layers and pooling layers.

One or more of the layers 502 may include a fully connected layer. Each neuron in the fully connected layer(s) may be connected to each of the neurons in the previous volume. The fully connected layer may compute class scores, and the resulting volume may be 1×1×N (where N is a number of classes). In some examples, the feature extractor layer(s) 502 may include a fully connected layer, while in other examples, the fully connected layer of the neural network 106A may be the fully connected layer separate from the feature extractor layer(s) 502. In some examples, no fully connected layers may be used by the feature extractor layer(s) 502 and/or the neural network 106A as a whole, in an effort to increase processing times and reduce computing resource requirements. In such examples, where no fully connected layers are used, the neural network 106A may be referred to as a fully convolutional network.

One or more of the layers 502 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images (e.g., the sensor data 104) to the neural network 106A, or used to up-sample to the input spatial resolution of a next layer.

Although input layers, convolutional layers, pooling layers, ReLU layers, deconvolutional layers, and fully connected layers are discussed herein with respect to the feature extractor layer(s) 502, this is not intended to be limiting. For example, additional or alternative layers 502 may be used in the feature extractor layer(s) 502, such as normalization layers, SoftMax layers, and/or other layer types.

The output of the feature extractor layer(s) 502 may be an input to spoofing attack layer(s) 504. The spoofing attack layer(s) 504A-C may use one or more of the layer types described herein with respect to the feature extractor layer(s) 502. As described herein, the spoofing attack layer(s) 504 may not include any fully connected layers, in some examples, to reduce processing speeds and decrease computing resource requirements. In such examples, the spoofing attack layers 504 may be referred to as fully convolutional layers.

Different orders and numbers of the layers 502 and 504 of the neural network 106A may be used, depending on the embodiment. For example, where two or more cameras or other sensor types are used to generate inputs, there may be a different order and number of layers 502 and 504 for one or more of the sensors 102. As another example, different ordering and numbering of layers may be used depending on the type of sensor used to generate the sensor data 104, or the type of the sensor data 104 (e.g., RGB, YUV, etc.). As such, the order and number of layers 502 and 504 of the neural network 106A is not limited to any one architecture.

In addition, some of the layers 502 and 504 may include parameters (e.g., weights and/or biases)—such as the feature extractor layer(s) 502 and/or the spoofing attack layer(s) 504—while others may not, such as the ReLU layers and pooling layers, for example. In some examples, the parameters may be learned by the neural network 106A during training. Further, some of the layers 502 and 504 may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

In any example, the output 108 of the neural network 106A may indicate whether a spoofing attack is occurring.

Figure 5B:
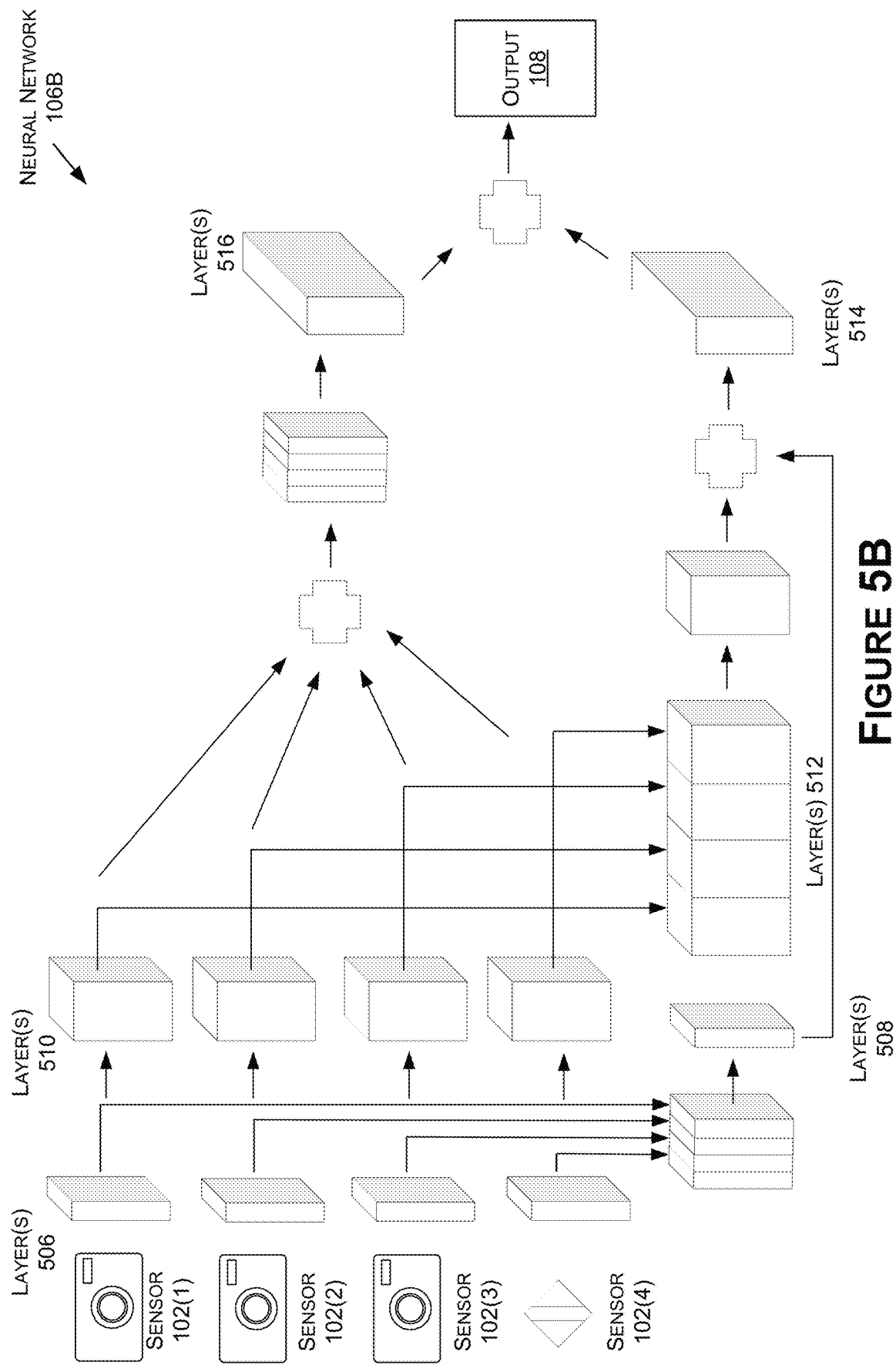

FIG. 5B is an illustration of another example of a neural network 106B, in accordance with some embodiments of the present disclosure. As shown, one or more first layers 506 process the sensor data 104 from the sensors 102. In some examples, the first layer(s) 506 process the sensor data 104 to generate feature maps representing low-level features for the sensor data 104 generated by each sensor 102. For example, the first layers(s) 502 may process the sensor data 104 to generate a first feature map representing first low-level features for the first sensor data 104(1) generated by the first sensor 102(1), a second feature map representing second low-level features for the second sensor data 104(2) generated by the second sensor 102(2), a third feature map representing third low-level features for the third sensor data 104(3) generated by the third sensor 102(3), and a fourth feature map representing fourth low-level features for the fourth sensor data 104(4) generated by the fourth sensor 102(4). In some examples, the feature maps are then combined and/or fused prior to processing by one or more second layers 508.

Next, one or more third layers 510 may then process the output from the first layer(s) 506 to generate feature maps representing high-level features for the sensor data 104 generated by each sensor 102. For example, the third layer(s) 510 may process the output from the first layer(s) 506 to generate a fifth feature map representing first high-level features determined using the first feature map, a sixth feature map representing second high-level features determined using the second feature map, a seventh feature map representing third high-level features determined using the third feature map, and an eighth feature map representing fourth high-level features determined using the fourth feature map. In some examples, the feature maps are then combined and/or fused prior to processing by one or more fourth layers 512.

The output from the fourth layer(s) 512 may then be concatenated with the output from the second layer(s) 508 to generate input to one or more fifth layers 514. Additionally, the output from the third layer(s) 510 (e.g., the feature maps) may be concatenated to generate input to one or more sixth layers 516. Next, the output from the fifth layer(s) 514 is concatenated with the output from the sixth layer(s) 516 to generate the output 108.

Referring back to FIG. 1, the process 100 may include an attack identifier 110 that analyzes the output 108 to determine whether a spoofing attack is occurring using one or more processes. For instance, and in some examples, if the output 108 indicates the Boolean output, then the attack identifier 110 may analyze the output 108 to determine whether the spoofing attack is occurring based on the value. For example, if a Boolean output of "0" indicates that a spoofing attack is not occurring and a Boolean output of "1" indicates that a spoofing attack is occurring, then the attack identifier 110 may determine that a spoofing attack is not occurring when the output 108 indicates the Boolean value of "0" or determine that a spoofing attack is occurring when the output 108 indicates the Boolean value of "1".

Additionally, or alternatively, in some examples, the output 108 may indicate a first probability (and/or a first confidence) that a spoofing attack is occurring and/or a second probability (and/or second confidence) that a spoofing attack is not occurring. In such examples, the attack identifier 110 may compare one or more of the probabilities to one or more threshold probabilities to determine whether the spoofing attack is occurring. For a first example, the attack identifier 110 may compare the first probability that the spoofing attack is occurring to a threshold probability. The attack identifier 110 may then determine that a spoofing attack is occurring when the first probability satisfies (e.g., is equal to or greater than) the threshold probability or determine that the spoofing attack is not occurring when the first probability does not satisfy (e.g., is less than) the threshold probability. For a second example, the attack identifier 110 may compare the second probability that the spoofing attack is not occurring to a threshold probability. The attack identifier 110 may then determine that a spoofing attack is occurring when the second probability does not satisfy (e.g., is less than) the threshold probability or determine that the spoofing attack is not occurring when the second probability satisfies (e.g., is equal to or greater than) the threshold probability. As described herein, the threshold probability may include, but is not limited to, 75%, 90%, 99%, 99.9%, and/or any other probability.

In some examples, the attack identifier 110 may use one or more temporal processing techniques to determine whether a spoofing attack is occurring. For example, the neural network 106 may continue to perform the processes described herein of receiving additional sensor data 104, processing the additional sensor data 104, and outputting additional outputs(s) 108 indicating whether a spoofing attack is occurring. The attack identifier 110 may then use the outputs 108—either alone or in combination (e.g., after temporal smoothing)—to continually determine whether a spoofing attack is occurring.

In some examples, the attack identifier 110 may determine that a spoofing attack is occurring when at least one output 108 indicates that a spoofing attack is occurring. For example, if the neural network 106 generates five outputs 108, where the fifth output 108 indicates that a spoofing attack is occurring, then the attack identifier 110 may determine that the spoofing attack is occurring. In some examples, the attack identifier 110 may determine that a spoofing attack is occurring when a threshold number (e.g., one, two, five, ten, etc.) and/or threshold percentage (e.g., 5%, 10%, 15%, etc.) of the outputs 108 indicates that a spoofing attack is occurring. For example, if the neural network 106 generates fifty outputs 108, where ten of the outputs 108 indicate that a spoofing attack is occurring, then the attack identifier 110 may determine that the spoofing attack is occurring if the threshold percentage is less than 20%.

Still, in some examples, such as when the outputs 108 indicate the first probabilities that a spoofing attack is occurring and/or the second probabilities that a spoofing attack is not occurring, the attack identifier 110 may use the outputs 108 to continually update a final probability. In such examples, the attack identifier 110 may determine the final probability as the average of the first probabilities, the average of the second probabilities, the median of the first probabilities, the median of the second probabilities, the mode of the first probabilities, the mode of the second probabilities, and/or using one or more additional and/or alternative techniques. Additionally, in some examples, the attack identifier 110 may determine the final probability using the most recent outputs 108, such as outputs 108 generated in the last ten seconds, the last thirty seconds, the last minute, and/or the like.

In any of these examples, the attack identifier 110 may then perform similar processes as those described above to determine whether a spoofing attack is occurring using the final probability. For example, if the final probability is associated with a spoofing attack occurring, then the attack identifier 110 may determine that the spoofing attack is occurring when the final probability satisfies (e.g., is equal to or greater than) the threshold probability or determine that the spoofing attack is not occurring when the final probability does not satisfy (e.g., is less than) the threshold probability.

The process 100 may then include the attack identifier 110 generating and outputting spoofing data 112 indicating whether a spoofing attack is occurring. The spoofing data 112 may represent a message, a notification, an alert, a sound, an image, a video, and/or any other type of content. In some examples, the spoofing data 112 may further indicate the type of spoofing attack that is occurring. For a first example, the spoofing data 112 may indicate that the spoofing attack includes the user 304 placing an image of another user over his or her face. For a second example, the spoofing data 112 may indicate that the spoofing attack includes a user wearing a mask of another user. In some examples, the attack identifier 110 sends the spoofing data 112 to another device, such as a client device of a verified user.

The process 100 may also include a user identifier 114 processing at least a portion of the sensor data 104, such as by using one or more facial recognition techniques, to identify or authenticate a user represented by the sensor data 104. In some examples, the user identifier 114 processes the sensor data 104 from more than one of the sensors 102 using the facial recognition technique(s). The user identifier 114 may then use the results from the processing to identify or authenticate the user. For a first example, the user identifier 114 may identity the user when at least one of the results indicates the identity of the user. For a second example, the user identifier 114 may identify the user when a threshold number and/or threshold percentage of the results indicates the identity of the user. In such an example, the threshold number may include, but is not limited to, one result, two results, five results, and/or any other number of results. Additionally, the threshold percentage may include, but is not limited to, 50%, 75%, 100%, and/or any other percentage.

In some examples, the user identifier 114 may initially process the sensor data 104 in order to select sensor data 104 that best represents the user for facial recognition. To identify the sensor data 104 that best represents the user, the user identifier 114 may identify respective characteristic(s) of the user as represented by the sensor data 104 generated by each sensor 102. The characteristics may include, but are not limited to, a pose of the user (e.g., is the user looking at the sensor 102, is the user looking away from the sensor 102, etc.), an amount of the face that is represented by the sensor data 104 (e.g., is a portion of the face represented by the sensor data 104, is an entirety of the face represented by the sensor data 104, etc.), an amount of the face that is occluded (e.g. is none of the face occluded by an object, is a part of the face occluded by an object, is an entirety of the face occluded by an object, etc.), a size of the face as represented by the sensor data 104 (e.g. a percentage of the pixels of the sensor data 104 that represent the face), and/or any other characteristic. The user identifier 114 may then use the characteristics to select the sensor data 104 (e.g., the first sensor data 104(1) in the example of FIG. 1) that best represents the face.

Figure 6:
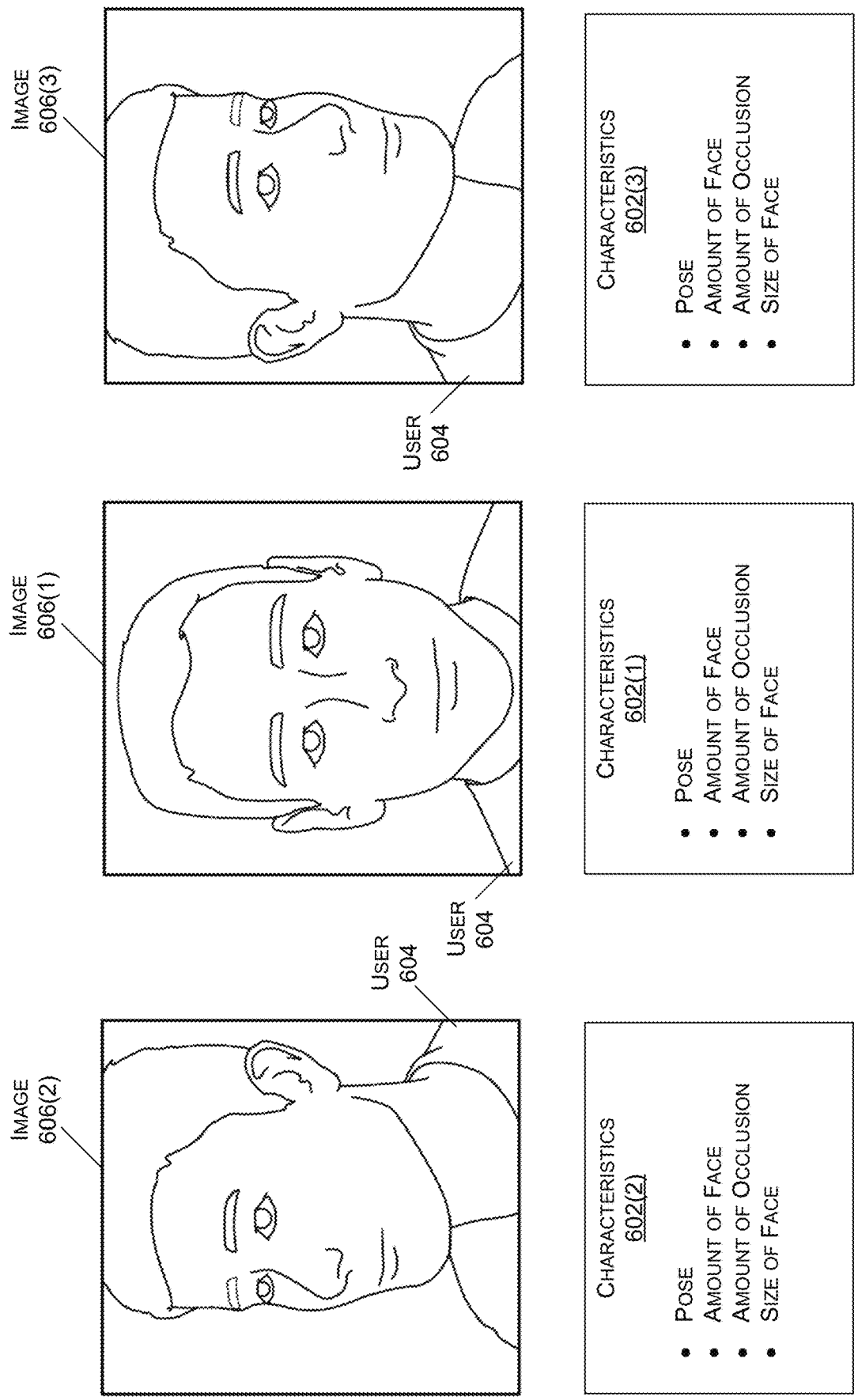
FIG. 6 illustrates an example of selecting sensor data for facial recognition, in accordance with some embodiments of the present disclosure.

For instance, FIG. 6 illustrates an example of selecting sensor data for facial recognition, in accordance with some embodiments of the present disclosure. As shown, the user identifier 114 may analyze the first sensor data 104(1) to determine one or more first characteristics 602(1) associated with a user 604 as depicted by a first image 606(1) represented by the first image data 104(1). In the example of FIG. 6, the pose may include the user 604 looking at the first sensor 102(1), the amount of the face represented by the first sensor data 102(1) may include an entirety of the face, the amount of the face occluded may include none of the face, and the size of the face may include 90% of the pixels. The user identifier 114 may also analyze the second sensor data 104(2) to determine one or more second characteristics 602(2) associated with the user 604 as depicted by a second image 606(2) represented by the second image data 104(2). In the example of FIG. 6, the pose may include the user 604 looking away from the second sensor 102(2), the amount of the face represented by the second sensor data 102(2) may include the left side and the front of the face, the amount of the face occluded may include none of the face, and the size of the face may include 90% of the pixels. Furthermore, the user identifier 114 may analyze the third sensor data 104(3) to determine one or more third characteristics 602(3) associated with the user 604 as depicted by a third image 606(3) represented by the third image data 104(3). In the example of FIG. 6, the pose may include the user 604 looking away from the third sensor 102(3), the amount of the face represented by the third sensor data 102(3) may include the right side and the front of the face, the amount of the face occluded may include none of the face, and the size of the face may include 90% of the pixels.

The user identifier 114 may then use the characteristics 602(1)-(3) to select at least a portion of the sensor data 104 for processing. For instance, and in the example of FIG. 6, since the first characteristic(s) 602(1) indicate that the first pose for the user 604 is facing the first sensor 102(1), the second characteristic(s) 602(2) indicate that the second pose for the user 604 is looking away from the second sensor 102(2), and the third characteristic(s) 602(3) indicate that the third pose for the user 604 is also looking away from the third sensor 102(3), the user identifier 114 may select the first sensor data 104(1) for facial recognition. While this is just one example technique for how the user identifier 114 may use the characteristics 602(1)-(3) to select sensor data 104, in other examples, the user identifier 114 may perform additional and/or alternative techniques.

For a first example, the user identifier 114 may select the sensor data 104 that represents the largest amount of the face of a user. For instance, if the first sensor data 104(1) only represents the eyes the user, the second sensor data 104(2) only represents the eyes and nose of the user, and the third sensor data 104(3) represents the entire face of the user 604, then the user identifier 114 may select the third sensor data 104(3). For a second example, the user identifier 114 may select the sensor data 104 that represents the largest size of the face of a user. For instance, if 30% of the pixels of the first sensor data 104(1) represent the face of the user, 50% of the pixels of the second sensor data 104(2) represent the face of the user, and 90% of the pixels of the third sensor data 104(3) represent the face of the user 604, then the user identifier 114 may again select the third sensor data 104(3).

Referring back to FIG. 1, the process 100 may include the user identifier 114 generating and outputting identity data 116 that represents the identity of the user represented by the sensor data 104. In some examples, the process 100 may then perform one or more further operations based on the identity of the user. For a first example, if the process 100 is being performed by a system of the vehicle 206 that provides control access to the vehicle 206, then the system may provide the user with the control access to the vehicle 206 when the identity data 116 indicates that the user is a verified user. For a second example, if the process 100 is being performed by a system that provides access to a secure environment, then the system may provide the user with the access to the secure environment when the identity data 116 indicates that the user is a verified user.

Figure 7:
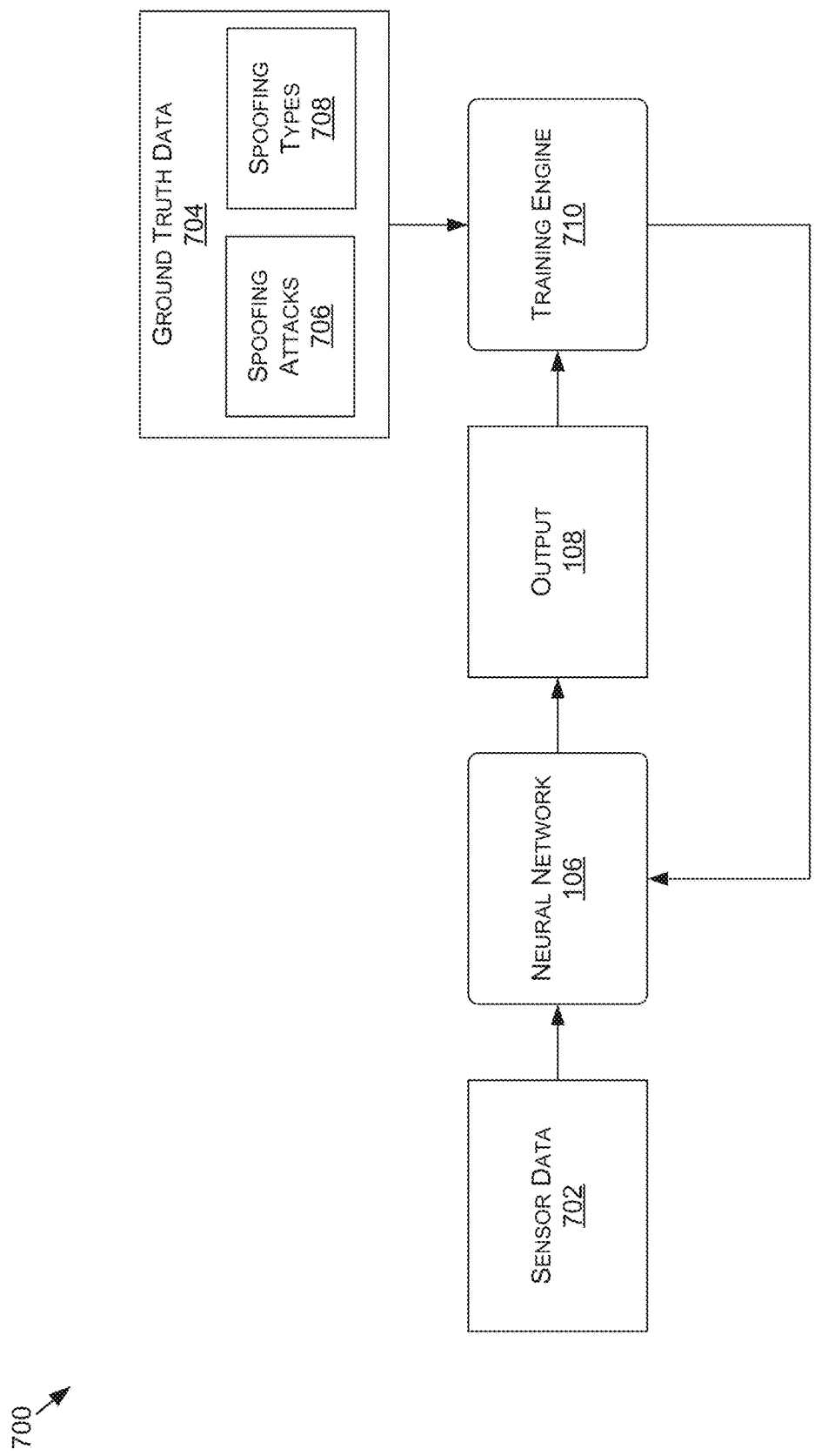
FIG. 7 is a data flow diagram illustrating a process for training a neural network for detecting spoofing attacks, in accordance with some embodiments of the present disclosure.

Now referring to FIG. 7, FIG. 7 is a data flow diagram illustrating a process 700 for training the neural network 106 (and/or the neural network 106A or the neural network 106B) to detect spoofing attacks, in accordance with some embodiments of the present disclosure. As shown, the neural network 106 may be trained using sensor data 702 (e.g., training sensor data). The sensor data 702 used for training may include original images (e.g., as captured by one or more image sensors), down-sampled images, up-sampled images, cropped or region of interest (ROI) images, otherwise augmented images, and/or a combination thereof. The sensor data 702 may represent images or other sensor data representations (e.g., point clouds, projection images, etc.) captured by one or more sensors (e.g., cameras, depth sensors, etc.), and/or may be images and/or other sensor data representations captured from within a virtual environment used for testing and/or generating training sensor data (e.g., a virtual camera of a virtual machine within a virtual or simulated environment). In some examples, the sensor data 702 may represent images and/or other sensor data representations from a data store or repository of training sensor data (e.g., images of driving surfaces, RADAR data from an automatic teller machine (ATM), images from a surveillance system, etc.).

The neural network 106 may be trained using the training sensor data 702 as well as corresponding ground truth data 704. The ground truth data 704 may include annotations, labels, masks, and/or the like. For example, in some embodiments, the ground truth data 704 may include spoofing attacks 706 (e.g., indicating whether a spoofing attack is present in the particular sensor data instance) and/or spoofing types 708 (e.g., mask, tablet, etc.). The ground truth data 704 may be generated within a drawing program (e.g., an annotation program), a computer aided design (CAD) program, a labeling program, another type of program suitable for generating the ground truth data 704, and/or may be hand drawn, in some examples. In any example, the ground truth data 704 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, for each input image, there may be corresponding ground truth data 704.

A training engine 710 may use one or more loss functions that measure loss (e.g., error) in the outputs 108 as compared to the ground truth data 704. Any type of loss function may be used, such as cross entropy loss, mean squared error, mean absolute error, mean bias error, and/or other loss function types. In some embodiments, different outputs 108 may have different loss functions. For example, the Boolean outputs may have a first loss function and the probabilities may have a second loss function. In such examples, the loss functions may be combined to form a total loss, and the total loss may be used to train (e.g., update the parameters of) the neural network 106. In any example, backward pass computations may be performed to recursively compute gradients of the loss function(s) with respect to training parameters. In some examples, weight and biases of the neural network 106 may be used to compute these gradients.

Figure 8:
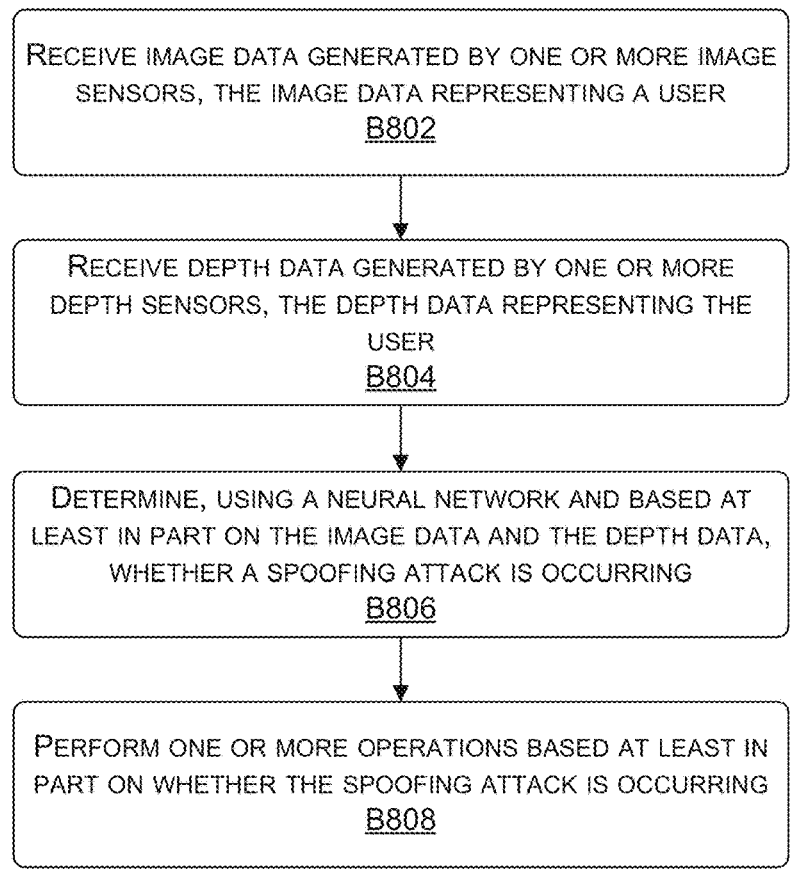
FIGS. 8-9 are flow diagrams showing methods for identifying a spoofing attack using sensors that include varying poses, in accordance with some embodiments of the present disclosure.
Figure 9:
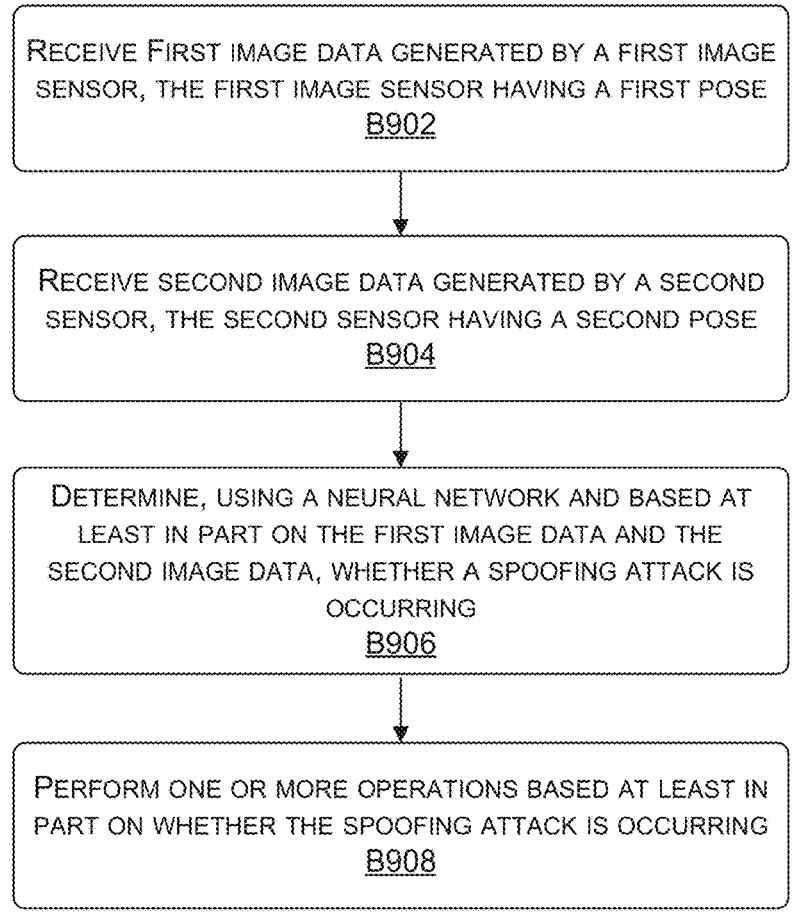

Now referring to FIGS. 8 and 9, each block of methods 800 and 900, described herein, comprises a computing process that may be performed using any combination of hardware, firmware, and/or software. For instance, various functions may be carried out by a processor executing instructions stored in memory. The methods 800 and 900 may also be embodied as computer-usable instructions stored on computer storage media. The methods 800 and 900 may be provided by a standalone application, a service or hosted service (standalone or in combination with another hosted service), or a plug-in to another product, to name a few. In addition, methods 800 and 900 are described, by way of example, with respect to the system of FIG. 1-2B. However, the methods 800 and 900 may additionally or alternatively be executed by any one system, or any combination of systems, including, but not limited to, those described herein.

FIG. 8 is a flow diagram showing a method for identifying a spoofing attack using sensors that include varying poses, in accordance with some embodiments of the present disclosure. The method 800, at block B802, includes receiving image data generated by one or more image sensors, the image data representing a user. For instance, the sensor data 104(1)-(3) (e.g., the image data) generated by the sensors 102(1)-(3) (e.g., the image sensors) may be received, where the sensor data 104(1)-(3) represents the user. As described herein, the sensors 102(1)-(3) may include varying poses in order to provide different perspective views of the user. For example, such as when the sensors 102(1)-(3) are located within the vehicle 206, the first sensor 102(1) may be located at the first position 202(1) and orientated in the first orientation 204(1) within the vehicle 206 to provide a first perspective view of the user, the second sensor 102(2) may be located at the second position 202(2) and orientated in the second orientation 204(2) within the vehicle 206 to provide a second perspective view of the user, and the third sensor 102(3) may be located at the third position 202(3) and orientated in the third orientation 204(3) within the vehicle 206 to provide a third perspective view of the user.

The method 800, at block B804, includes receiving depth data generated by one or more depth sensors, the depth data representing the user. For instance, the fourth sensor data 104(4) (e.g., the depth data) generated by the fourth sensor 102(4) (e.g., the depth sensor) may be received, where the fourth sensor data 104(4) also represents the user (e.g., has a field of view or sensor field including the user). In some examples, the fourth sensor 102(4) may be located proximate to one or more of the sensors 102(1)-(3) within the vehicle 206. In other examples, the fourth sensor 102(4) may be located at a fourth position and/or oriented in a fourth orientation within the vehicle 206 to provide a fourth perspective view of the user.

The method 800, at block B806, includes determining, using the neural network and based at least in part on the image data and the depth data, whether a spoofing attack is occurring. For instance, the sensor data 104 may be applied to the neural network 106 that is configured to determine whether spoofing attacks are occurring. In some examples, and as described herein, using both the image data and the depth data may increase the accuracy of the neural network 106. This is because the neural network 106 may use features determined using the image data as well as features determined using the depth data to determine whether the spoofing attack is occurring.

For example, if the user is placing a 2D mask over his or her face in order to try and imitate a verified user, then conventional systems may not detect the spoofing attack just using image data generated by a camera—e.g., because the image data is 2D thus not capturing the lack of contour of the 2D mask. In contrast, the neural network 106 also uses the depth data, which may represent points on both the user's face as well as the mask. As such, the neural network 106 is able to detect that the spoofing attack is occurring using at least the points represented by the depth data, as the lack of a change in depth across the entirety of the face of the 2D mask may signal to the neural network 206 that a spoofing attack is occurring.

In some examples, the attack identifier 110 may determine whether the spoofing attack is occurring using the output 108 from the neural network 106. For a first example, such as when the output 108 from the neural network 106 indicates a first probability that the spoofing attack is occurring and/or a second probability that the spoofing attack is not occurring, the attack identifier 110 may determine that the spoofing attack is occurring when the first probability satisfies (e.g., is equal to or greater than) a threshold probability or determine that the spoofing attack is not occurring when the first probability does not satisfy (e.g., is less than) the threshold probability. For a second example, such as when the output 108 includes an indicator (e.g., a Boolean value), the attack identifier 110 may use the indicator to determine if the spoofing attack is occurring or if the spoofing attack is not occurring.

The method 800, at block B808, includes performing one or more operations based at least in part on whether the spoofing attack is occurring. For instance, one or more processes may be performed based on whether the spoofing attack is occurring. In some examples, based on the attack identifier 110 determining that the spoofing attack is not occurring, the user identifier 114 may analyze at least a portion of the sensor data 104(1)-(2) to identify the user. Additionally, the user may be provided with one or more controls, such as one or more access controls of the vehicle 206. In some examples, based on the attack identifier 110 determining that the spoofing attack is occurring, data (e.g., a message, a notification, an alert, a sound, an image, a video, and/or any other type of content) may be generated indicating that the spoofing attack is occurring. Additionally, the user may not be provided with the one or more controls.

FIG. 9 is a flow diagram showing another method 900 for identifying a spoofing attack using sensors that include varying poses, in accordance with some embodiments of the present disclosure. The method 900, at block B902, includes receiving first image data generated by a first image sensor, the first image sensor having a first pose. For instance, the first sensor data 104(1) (e.g., the first image data) generated by the first sensor 102(1) (e.g., the first image sensor) may be received, where the first sensor data 104(1) represents a user. As described herein, the first sensor 102(1) may include the first pose in order to capture a first perspective view of the user. For example, such as when the first sensor 102(1) is located within the vehicle 206, the first sensor 102(1) may be located at the first position 202(1) and orientated in the first direction 204(1) within the vehicle 206 to provide the first perspective view of the user.

The method 900, at block B904, includes receiving second image data generated by a second image sensor, the second image sensor having a second pose. For instance, the second sensor data 104(2) (e.g., the second image data) generated by the second sensor 102(2) (e.g., the second image sensor) may be received, where the second sensor data 104(2) represents the user. As described herein, the second sensor 102(2) may include the second pose in order to capture a second perspective view of the user. For example, such as when the second sensor 102(2) is also located within the vehicle 206, the second sensor 102(2) may be located at the second position 202(2) and orientated in the second orientation 204(2) within the vehicle 206 to provide the second perspective view of the user.

The method 900, at block B906, includes determining, using the neural network and based at least in part on the first image data and the second image data, whether a spoofing attack is occurring. For instance, the sensor data 104(1)-(2) may be applied to the neural network 106 that is configured to determine whether spoofing attacks are occurring. In some examples, and as described herein, using the sensor data 104(1)-(2) representing the different perspective views of the user may increase the accuracy of the neural network 106.

For instance, and as illustrated by the example of FIG. 3 where the user 304 is wearing the mask, the first image 306(1) represented by the first sensor data 104(1) mostly depicts the mask, but without much of the face of the user 304. However, the second image 306(2) represented by the second sensor data 104(2) depicts both the mask and a large portion of the face of the user 304. As such, applying both the first sensor data 104(1) and the second sensor data 104(2) to the neural network 106 may provide additional information that the neural network 106 may use to identify the spoofing attack. For instance, the neural network 106 may be able to determine that the user 304 is wearing the mask based at least on the second sensor data 104(2).

In some examples, the attack identifier 110 may determine whether the spoofing attack is occurring using the output 108 from the neural network 106. For a first example, such as when the output 108 from the neural network 106 indicates a first probability that the spoofing attack is occurring and/or a second probability that the spoofing attack is not occurring, the attack identifier 110 may determine that the spoofing attack is occurring when the first probability satisfies (e.g., is equal to or greater than) a threshold probability or determine that the spoofing attack is not occurring when the first probability does not satisfy (e.g., is less than) the threshold probability. For a second example, such as when the output 108 includes an indicator (e.g., a Boolean value), the attack identifier 110 may use the indicator to determine if the spoofing attack is occurring or if the spoofing attack is not occurring.

The method 900, at block B908, includes performing one or more operations based at least in part on whether the spoofing attack is occurring. For instance, one or more processes may be performed based on whether the spoofing attack is occurring. In some examples, based on the attack identifier 110 determining that the spoofing attack is not occurring, the user identifier 114 may analyze at least a portion of the sensor data 104(1)-(2) to identify the user. Additionally, the user may be provided with one or more controls, such as one or more access controls of the vehicle 206. In some examples, based on the attack identifier 110 determining that the spoofing attack is occurring, data (e.g., a message, a notification, an alert, a sound, an image, a video, and/or any other type of content) may be generated indicating that the spoofing attack is occurring. Additionally, the user may not be provided with the one or more controls.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, spoofing attack identification, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 10A:
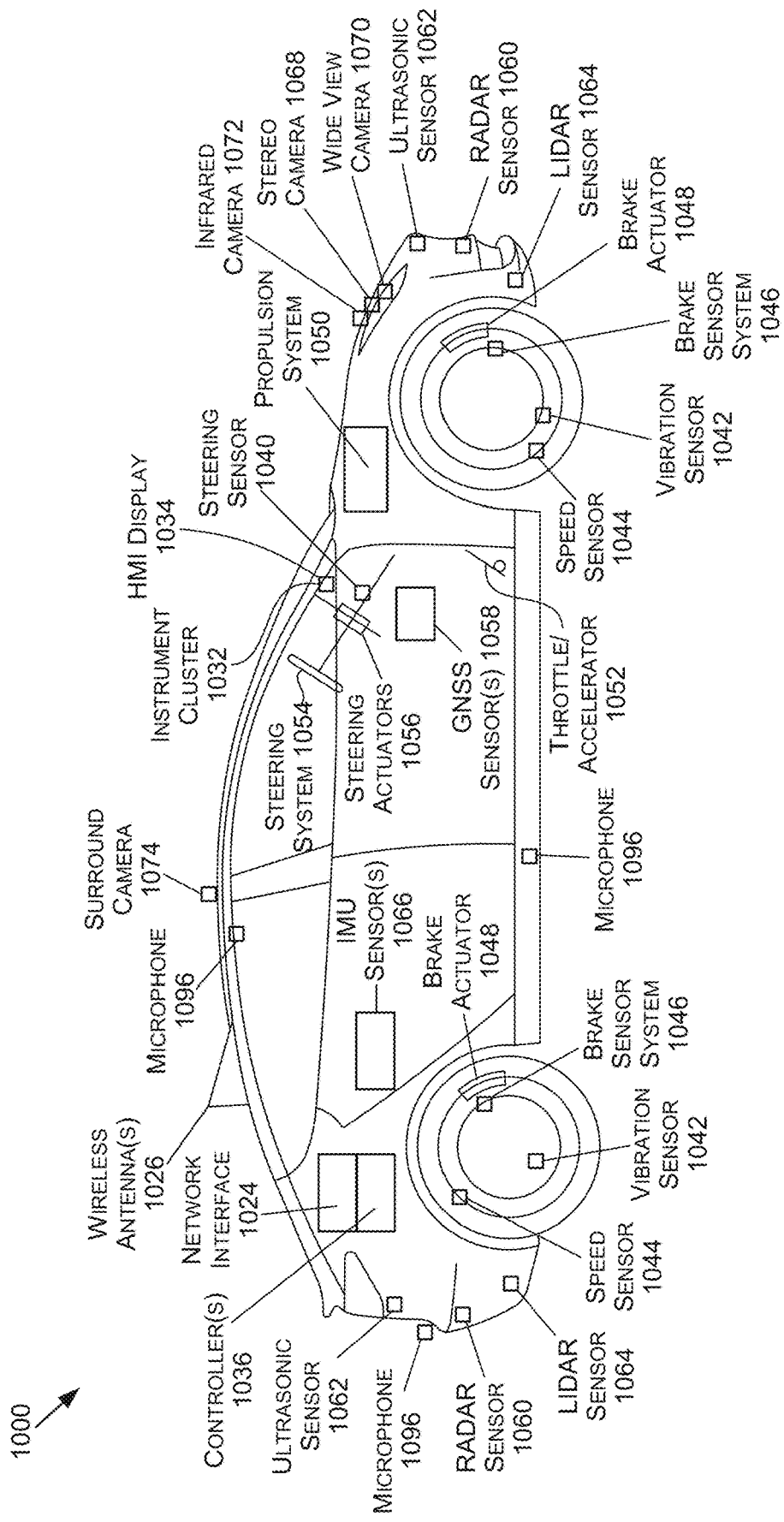
FIG. 10A is an illustration of an example autonomous vehicle, in accordance with some embodiments of the present disclosure.

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. The vehicle 1000 may be capable of functionality in accordance with one or more of Level 1-Level 5 of the autonomous driving levels. For example, the vehicle 1000 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1000 or other machine, such as being fully autonomous, being highly autonomous, being conditionally autonomous, being partially autonomous, providing assistive autonomy, being semi-autonomous, being primarily autonomous, or other designation.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the High Definition ("HD") map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1026 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 10B:
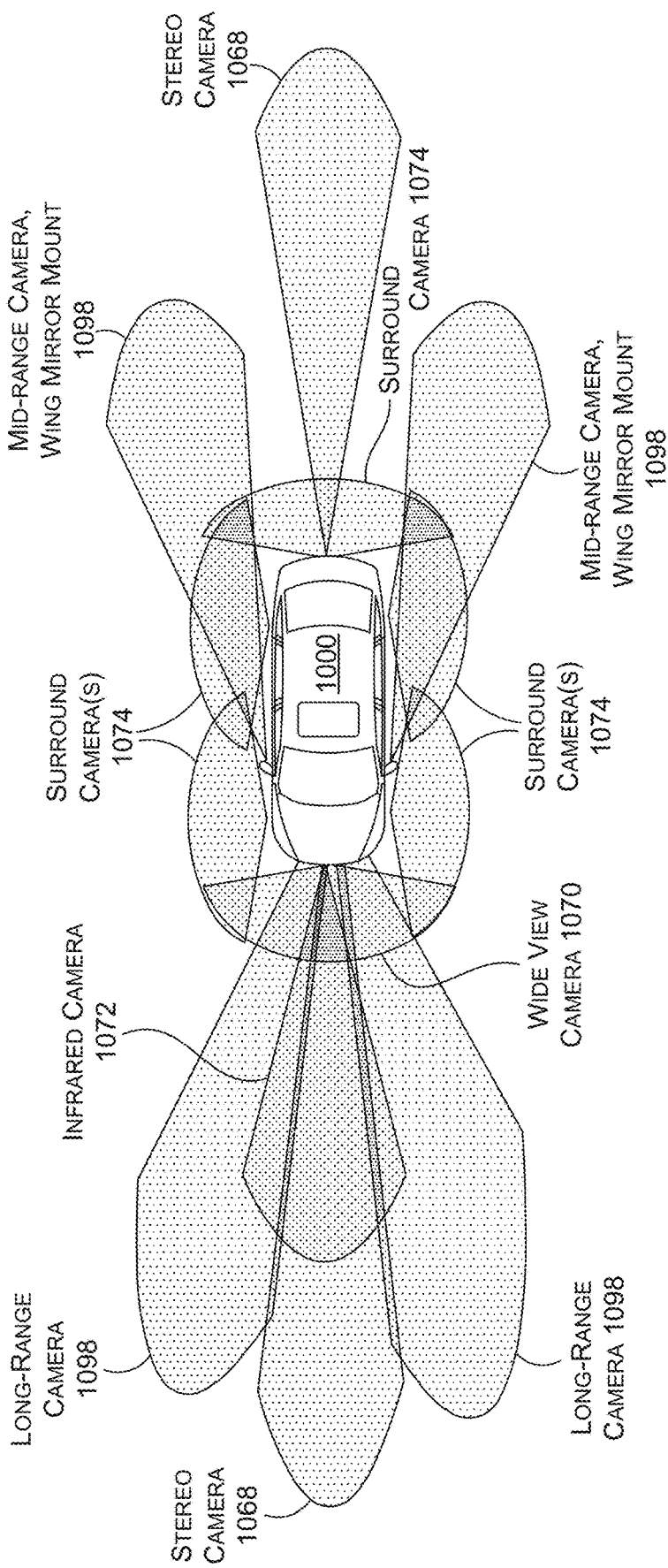
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may be any number (including zero) of wide-view cameras 1070 on the vehicle 1000. In addition, any number of long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

Any number of stereo cameras 1068 may also be included in a front-facing configuration. In at least one embodiment, one or more of stereo camera(s) 1068 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Cameras (e.g., the sensors 102(1)-(3)) may also be located within the interior of the vehicle 1000. As described herein, the cameras may be located at different positions and/or oriented in different directions in order to provide different poses for the cameras. This way, the cameras are able to capture different perspective views of users, such as the driver of the vehicle 1000. As described herein, the image data generated by these cameras may then be used to determine whether a spoofing attack is occurring.

Figure 10C:
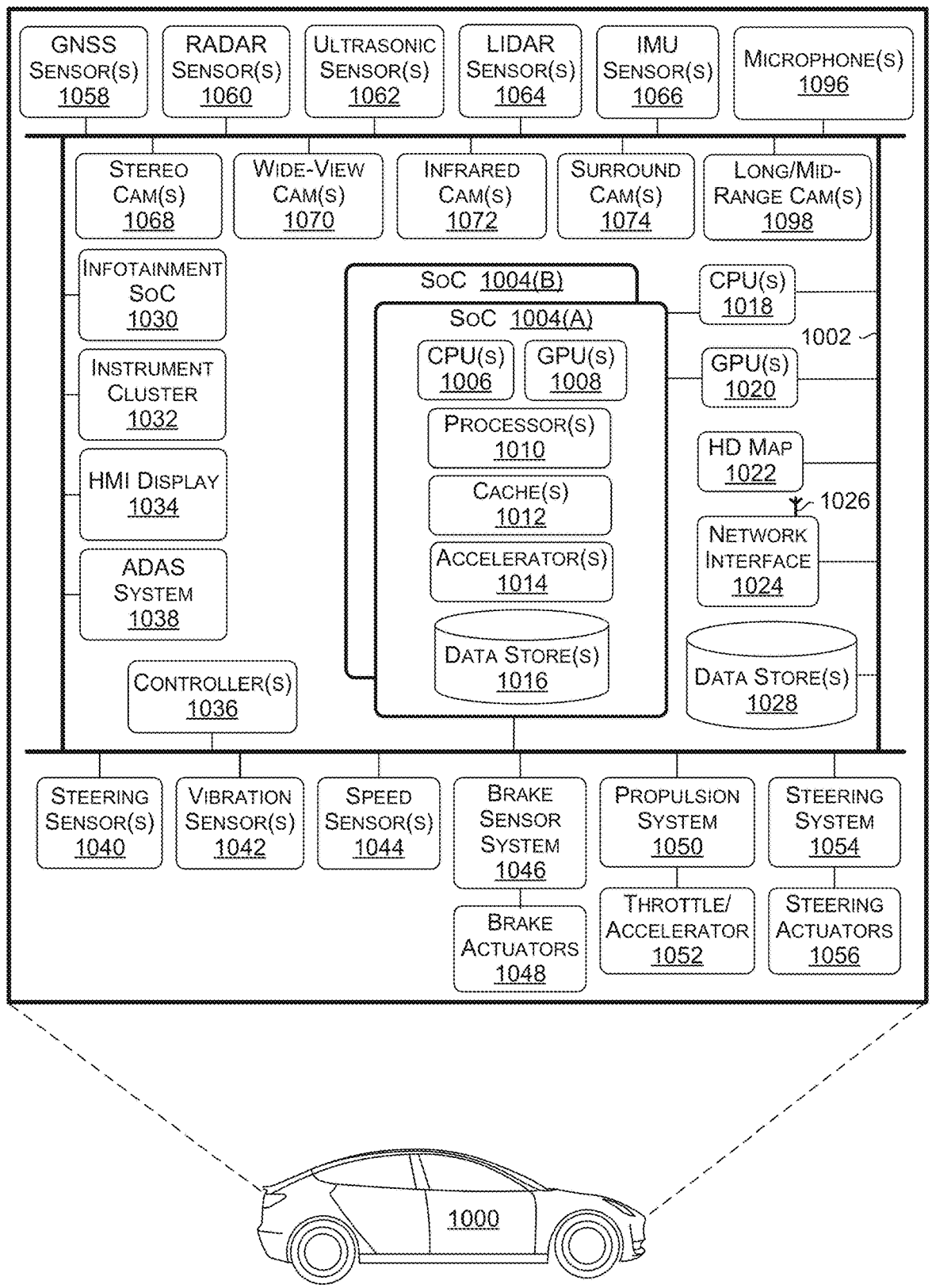
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
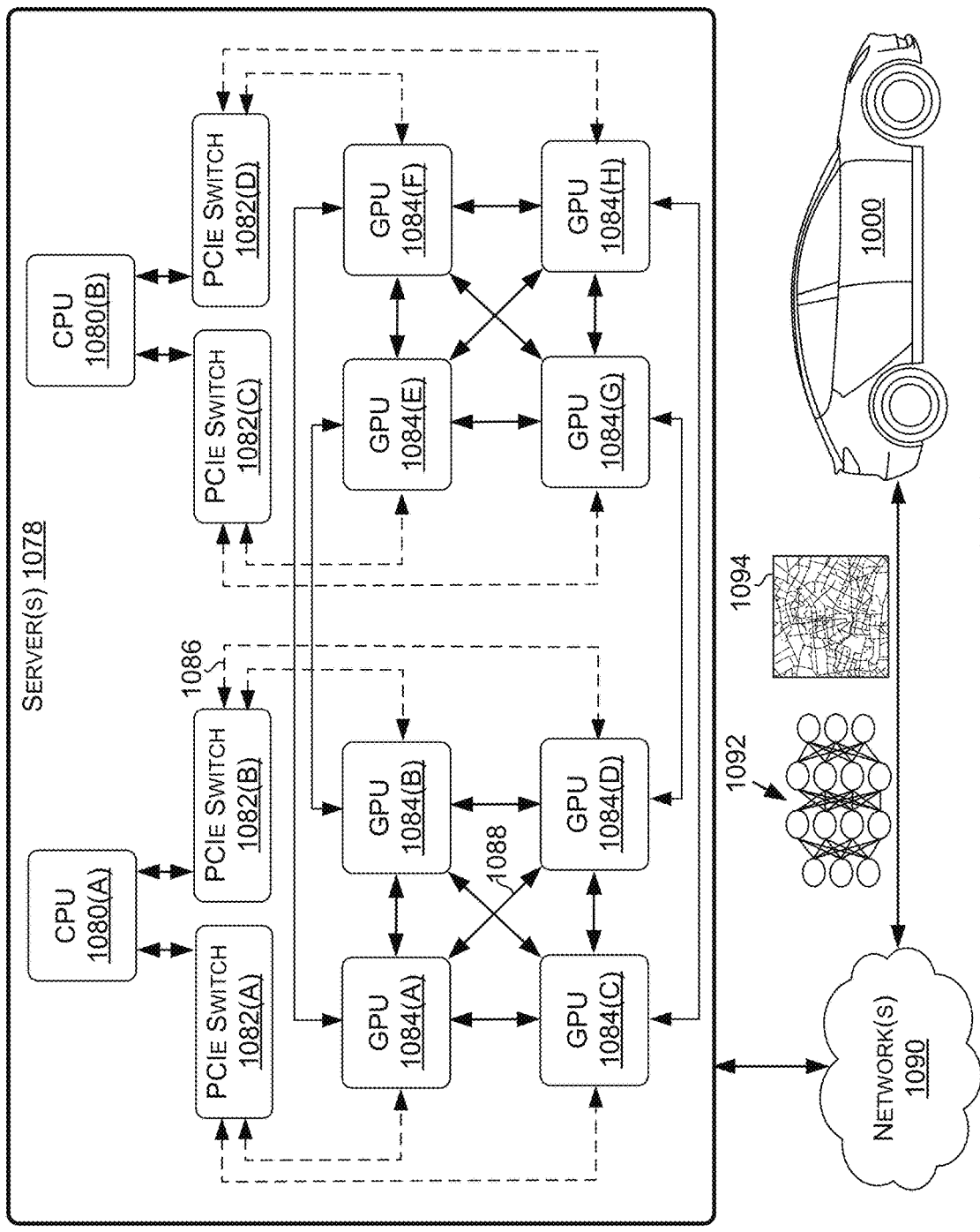
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
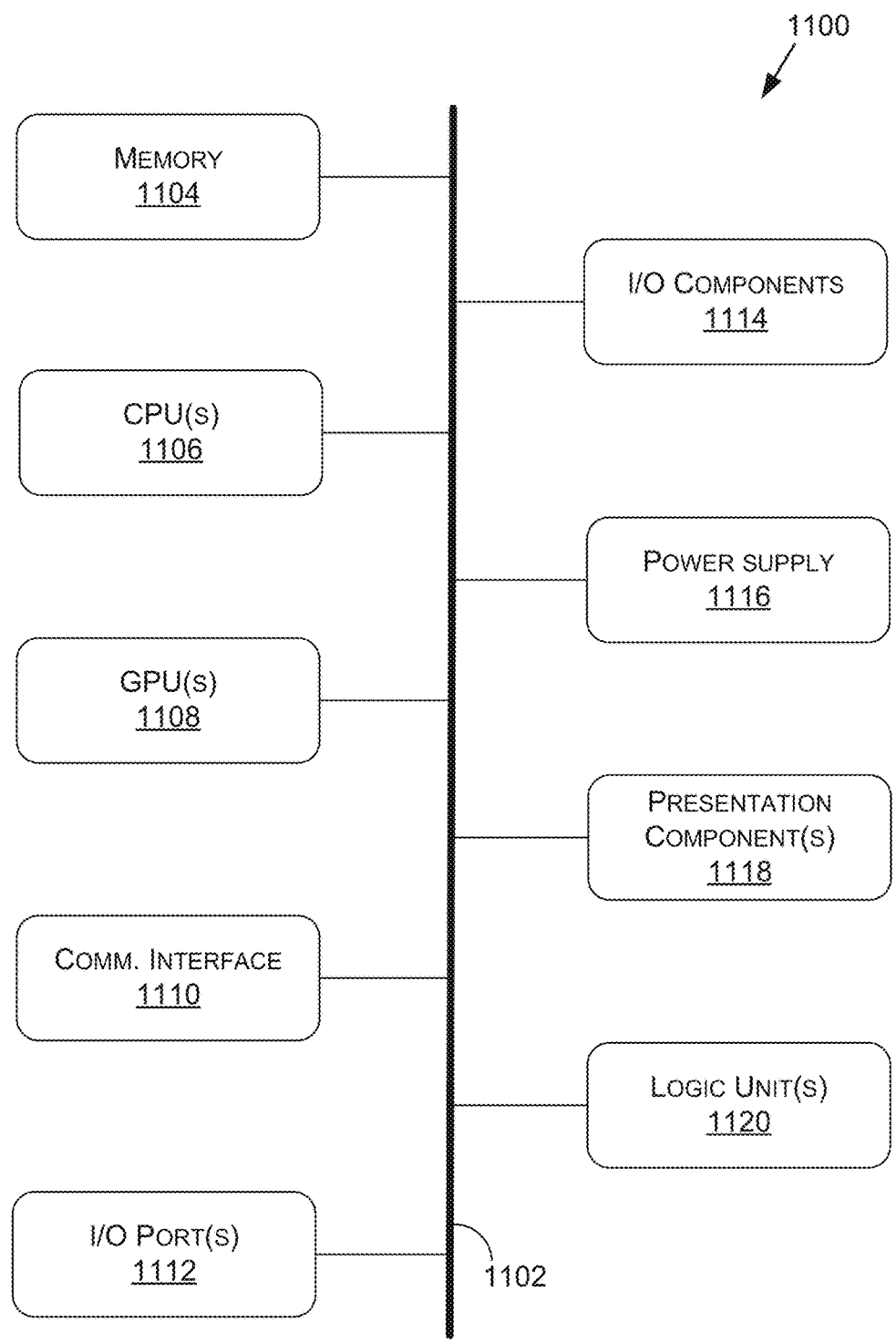
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
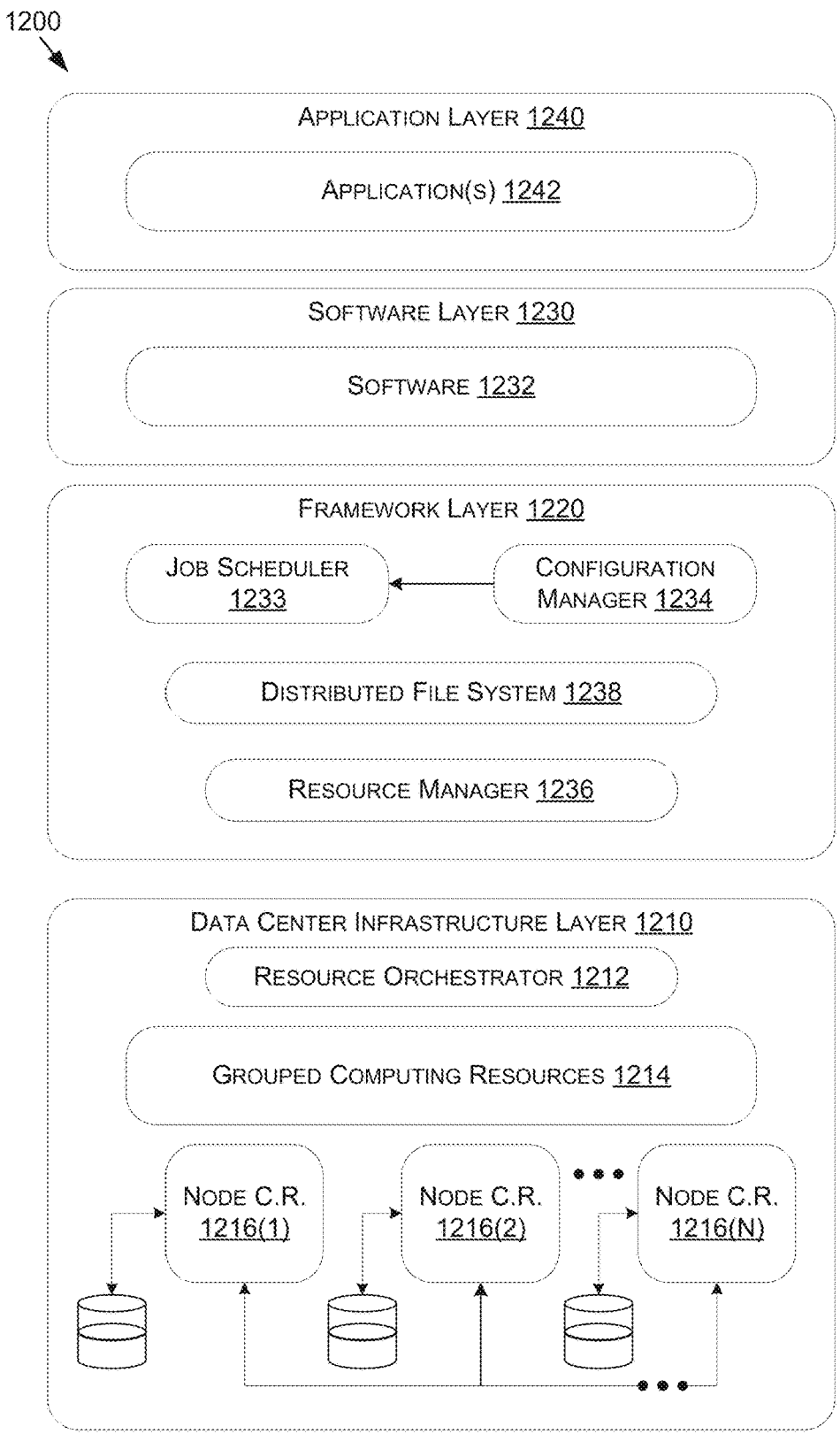
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1233, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application (s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1233 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1233. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216 (1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving, using one or more image sensors located at one or more first locations within a vehicle, image data representative of one or more images depicting a user;
   receiving, using one or more depth sensors located at one or more second locations within the vehicle, depth data representative of one or more distance values associated with the user located within the vehicle;
   generating, based at least on one or more first layers of one or more neural networks processing the image data, one or more first feature maps corresponding to one or more first features as represented by the image data;
   generating, based at least on one or more second layers of the one or more neural networks processing the depth data, one or more second feature maps corresponding to one or more second features represented by the depth data;
   generating, based at least on the one or more neural networks fusing the one or more first feature maps with the one or more second feature maps, one or more fused feature maps;
   generating, based at least on the one or more neural networks processing the one or more fused feature maps, output data indicating whether a spoofing attack is occurring with regard to the user; and
   performing one or more operations based at least on whether the spoofing attack is occurring with regard to the user.

2. The method of claim 1, wherein:
   the output data represents a probability that the spoofing attack is occurring; and
   the method further comprises one of:
      determining that the spoofing attack is occurring based at least on the probability satisfying a threshold probability; or
      determining that the spoofing attack is not occurring based at least on the probability not satisfying the threshold probability.

3. The method of claim 1, further comprising:
   receiving, using the one or more image sensors, second image data at a different time than the image data was received; and receiving, using the one or more depth sensors, second depth data at a different time than the depth data was received;

wherein the one or more neural networks further process the second image data and the second depth data to generate the output data.

4. The method of claim 1, wherein:

an image sensor of the one or more image sensors has a first field-of-view (FOV) of an interior compartment of the vehicle; and a depth sensor of the one or more depth sensors has a second FOV of the interior compartment of the vehicle, the second FOV being different from the first FOV and at least partially overlapping with the first FOV.

5. The method of claim 1, wherein the one or more image sensors comprise:

a first image sensor having a first pose and a first field-of-view (FOV); and a second image sensor having a second pose that is different from the first pose and a second FOV that is different from the first FOV, the second FOV at least partially overlapping with the first FOV.

6. The method of claim 1, wherein the one or more neural networks are trained using at least one or more training images representing one or more users and ground truth data indicating whether the one or more training images represent one or more spoofing attacks.

7. The method of claim 1, further comprising:

generating, using the one or more neural networks and based at least on the one or more first feature maps, one or more third feature maps corresponding to one or more first high-level features as represented by the image data; and generating, using the one or more neural networks and based at least on the one or more second feature maps, one or more fourth feature maps corresponding to one or more second high-level features represented by the depth data, wherein the generating the output data is further based at least on the one or more neural networks processing the one or more third feature maps and the one or more fourth feature maps.

8. The method of claim 7, further comprising:

generating, using the one or more neural networks and based at least on the one or more first feature maps, one or more third feature maps corresponding to one or more first high-level features as represented by the image data; and generating, using the one or more neural networks and based at least on the one or more second feature maps, one or more fourth feature maps corresponding to one or more second high-level features represented by the depth data, wherein the generating the one or more fused feature maps is further based at least on the one or more neural networks fusing the one or more third feature maps with the one or more fourth feature maps.

9. A processor comprising:

processing circuitry to:

receive, using an image sensor having a first pose, image data representative of one or more images depicting a user;

receive, using a depth sensor having a second pose different from the first pose, depth data representative of one or more depth values associated with the user;

generate, based at least on one or more first layers one or more neural networks processing the image data, one or more first feature maps corresponding to one or more first features as represented by the image data;

generate, based at least on one or more second layers of the one or more neural networks processing the depth data, one or more second feature maps corresponding to one or more second features as represented by the depth data;

generate, based at least on the one or more neural networks fusing the one or more first feature maps with the one or more second feature maps, one or more fused feature maps;

determine, based at least on the one or more neural networks processing the one or more fused feature maps, whether a spoofing attack is occurring; and perform one or more processes based at least in part on the determination of whether the spoofing attack is occurring.

10. The processor of claim 9, wherein the determination of whether the spoofing attack is occurring comprises:

determining, based at least on the one or more the neural networks processing the one or more fused feature maps, a probability that the spoofing attack is occurring; and one of:

determining that the spoofing attack is occurring based at least on the probability satisfying a threshold probability; or determining that the spoofing attack is not occurring based at least on the probability not satisfying the threshold probability.

11. The processor of claim 9, wherein the processing circuitry is further to:

receive, using the image sensor, second image data; and receive, using the depth sensor, second depth data, wherein the determination of whether the spoofing attack is occurring is further based at least on the one or more neural networks processing the second image data and the second depth data.

12. The processor of claim 9, wherein:

the image sensor has a first field of view (FOV); and the depth sensor has a second FOV that is different from the first FOV and at least partially overlaps with the first FOV.

13. The processor of claim 9, wherein:

the image data represents a first perspective view of the user; and the depth data represents a second perspective view of the user, the second perspective view being different from the first perspective view.

14. The processor of claim 9, wherein the processing circuitry is further to:

determine one or more first characteristics of the user as represented by the image data;

determine one or more second characteristics of the user as represented by the depth data; and select the image data for performing facial recognition based at least on the one or more first characteristics and the one or more second characteristics.

15. The processor of claim 9, wherein the one or more processes include at least one of:

generating an indication that the spoofing attack is occurring based at least on the spoofing attack occurring; or authenticating, using at least one of the image data or the depth data, the user based at least on the spoofing attack not occurring.

16. The processor of claim 9, wherein the processor is comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for performing deep learning operations;
   a system implemented using an edge device;
   a system implemented using a robot;
   a system for performing conversational AI operations;
   a system for generating synthetic data;
   a system incorporating one or more virtual machines (VMs);
   a system implemented at least partially in a data center; or
   a system implemented at least partially using cloud computing resources.

17. The processor of claim 9, wherein:
   the performance of the one or more processes comprises, based at least on the spoofing attack not occurring, determining, based at least on one or more second neural networks processing at least one of the image data or the depth data, an identifier of a user; and
   the one or more second neural networks are different than the one or more neural networks.

18. A system comprising:
   one or more processors to:
      obtain, using an image sensor having a first pose, image data representative of one or more images depicting a user;
      obtain, using a depth sensor having a second pose different from the first pose, depth data representative of one or more depth values associated with the user;
      generate, using one or more first layers of a neural network, one or more first feature maps corresponding to one or more first features as represented by the image data;
      generate, using one or more second layers of the neural network, one or more second feature maps corresponding to one or more second features as represented by depth data;
      compute, using one or more third layers of the neural network and based at least on fusing the one or more first feature maps with the one or more second feature maps, an output indicating whether a spoofing attack associated with the user is occurring.

19. The system of claim 18, wherein the system is comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for performing deep learning operations;
   a system implemented using an edge device;
   a system implemented using a robot;
   a system for performing conversational AI operations;
   a system for generating synthetic data;
   a system incorporating one or more virtual machines (VMs);
   a system implemented at least partially in a data center; or
   a system implemented at least partially using cloud computing resources.

20. The system of claim 18, wherein:
   the generation of the one or more first feature maps corresponding to the one or more first features comprises:
      generating, based at least on the one or more first layers of the neural network processing the image data, one or more third feature maps that are associated with one or more first low-level features; and
      generating, based at least on the neural network processing the one or more third feature maps, the one or more first feature maps associated with one or more first high-level features; and
   the generation of the one or more second feature maps corresponding to the one or more second features comprises:
      generating, based at least on the one or more second layers of the neural network processing the depth data, one or more fourth feature maps that are associated with one or more second low-level features; and
      generating, based at least on the neural network processing the one or more fourth feature maps, the one or more second feature maps associated with one or more second high-level features.

* * * * *